(12) United States Patent  
Das et al.

(10) Patent No.: US 8,938,211 B2
(45) Date of Patent: Jan. 20, 2015

(54) PROVIDING AND UTILIZING MAPS IN LOCATION DETERMINATION BASED ON RSSI AND RTT DATA

(71) Applicant: QUALCOMM Incorporated, San Diego, CA (US)

(72) Inventors: Saumitra Mohan Das, Santa Clara, CA (US); Alok Aggarwal, Foster City, CA (US); Ayman Fawzy Naguib, Cupertino, CA (US); Vinay Sridhara, Santa Clara, CA (US); Edward Thomas Lingham Hardie, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/707,484

(22) Filed: Dec. 6, 2012

(65) Prior Publication Data
US 2013/0109413 A1 May 2, 2013

Related U.S. Application Data

(63) Continuation-in-part of application No. 12/641,225, filed on Dec. 17, 2009.

(60) Provisional application No. 61/139,993, filed on Dec. 22, 2008, provisional application No. 61/140,023, filed on Dec. 22, 2008.

(51) Int. Cl.
*H04M 11/04* (2006.01)
*H04W 4/00* (2009.01)
(Continued)

(52) U.S. Cl.
CPC ............... *H04W 4/04* (2013.01); *H04W 64/00* (2013.01); *H04W 4/043* (2013.01); *H04W 4/02* (2013.01)
USPC ...................................... 455/404.2; 370/338

(58) Field of Classification Search
CPC ....... H04W 4/043; H04W 4/02; H04W 4/021; H04W 4/04; H04W 64/00; H04W 64/003; H04W 64/006
USPC .............. 340/450; 370/338; 455/404.2, 456.2
See application file for complete search history.

(56) References Cited

U.S. PATENT DOCUMENTS 6,215,441 B1  4/2001  Moeglein et al.
6,282,426 B1  8/2001  Wang
(Continued)

FOREIGN PATENT DOCUMENTS

CN  1413424 A  4/2003
CN  1448856 A  10/2003
(Continued)

OTHER PUBLICATIONS

Sanpechuda, T., and L. Kovavisaruch. "A review of RFID localization: Applications and techniques." Electrical Engineering/Electronics, Computer, Telecommunications and Information Technology, 2008. ECTI-CON 2008. 5th International Conference on. vol. 2. IEEE, 2008.*

(Continued)

*Primary Examiner* — Dang Ton
*Assistant Examiner* — Ryan Kavleski

(57) ABSTRACT

The subject matter disclosed herein relates to utilizing location information, such as maps, in location determination based on Received Signal Strength Indication (RSSI) and Round-Trip Time (RTT) data. Weighting information can be determined from and/or provided in the location information. The weighting information associated with an area in which a mobile device is located can impact how RSSI and RTT data is weighted in a calculation of the mobile device's location.

27 Claims, 12 Drawing Sheets

(51) Int. Cl.
*H04W 4/04* (2009.01)
*H04W 64/00* (2009.01)
*H04W 4/02* (2009.01)

(56) References Cited

U.S. PATENT DOCUMENTS

| | | | |
|---|---|---|---|
| 6,295,502 B1 | 9/2001 | Hancock et al. | |
| 6,456,239 B1* | 9/2002 | Werb et al. | 342/463 |
| 6,473,523 B1 | 10/2002 | Newman et al. | |
| 6,493,766 B1 | 12/2002 | Buchholz et al. | |
| 7,414,988 B2 | 8/2008 | Jones et al. | |
| 7,509,215 B2 | 3/2009 | Shen et al. | |
| 7,519,376 B2 | 4/2009 | Chang | |
| 8,041,555 B2 | 10/2011 | Buccella | |
| 8,165,599 B1* | 4/2012 | Dronamraju et al. | 455/456.1 |
| 8,468,154 B2 | 6/2013 | Leino et al. | |
| 8,718,410 B2 | 5/2014 | Boncyk et al. | |
| 8,731,581 B2 | 5/2014 | Blumberg et al. | |
| 2002/0163907 A1 | 11/2002 | Odenwalder et al. | |
| 2003/0100316 A1 | 5/2003 | Odamura | |
| 2003/0176965 A1 | 9/2003 | Padmanabhan | |
| 2003/0234807 A1 | 12/2003 | Onbe et al. | |
| 2004/0176906 A1 | 9/2004 | Matsubara et al. | |
| 2004/0203880 A1 | 10/2004 | Riley | |
| 2004/0203931 A1 | 10/2004 | Karaoguz | |
| 2004/0224703 A1 | 11/2004 | Takaki et al. | |
| 2004/0249983 A1 | 12/2004 | Bedner | |
| 2005/0059439 A1 | 3/2005 | White et al. | |
| 2005/0117750 A1 | 6/2005 | Rekimoto | |
| 2005/0192024 A1* | 9/2005 | Sheynblat | 455/456.1 |
| 2005/0265321 A1 | 12/2005 | Rappaport et al. | |
| 2006/0022048 A1 | 2/2006 | Johnson | |
| 2006/0046709 A1 | 3/2006 | Krumm et al. | |
| 2006/0171588 A1 | 8/2006 | Chellapilla et al. | |
| 2006/0204098 A1 | 9/2006 | Gaast | |
| 2006/0215736 A1 | 9/2006 | Rasmussen | |
| 2007/0001904 A1* | 1/2007 | Mendelson | 342/450 |
| 2007/0025456 A1 | 2/2007 | McCrady | |
| 2007/0026847 A1 | 2/2007 | Polk et al. | |
| 2007/0037558 A1 | 2/2007 | Yu et al. | |
| 2007/0140595 A1 | 6/2007 | Taylor et al. | |
| 2007/0270122 A1 | 11/2007 | Ewell | |
| 2008/0032706 A1* | 2/2008 | Sheynblat et al. | 455/456.1 |
| 2008/0039120 A1 | 2/2008 | Gad | |
| 2008/0101277 A1 | 5/2008 | Taylor et al. | |
| 2009/0003332 A1 | 1/2009 | Flanagan et al. | |
| 2009/0037099 A1 | 2/2009 | Joshi | |
| 2009/0040370 A1 | 2/2009 | Varanasi | |
| 2009/0201208 A1 | 8/2009 | McPherson et al. | |
| 2009/0204319 A1 | 8/2009 | Shanbhag et al. | |
| 2009/0319166 A1 | 12/2009 | Khosravy et al. | |
| 2010/0063889 A1 | 3/2010 | Proctor, Jr. et al. | |
| 2010/0128131 A1 | 5/2010 | Tenchio et al. | |
| 2010/0135178 A1 | 6/2010 | Aggarwal et al. | |
| 2010/0157848 A1 | 6/2010 | Das et al. | |
| 2010/0172259 A1 | 7/2010 | Aggarwal et al. | |
| 2010/0235091 A1 | 9/2010 | Das et al. | |
| 2010/0304755 A1 | 12/2010 | Rice et al. | |
| 2011/0045840 A1 | 2/2011 | Alizadeh-Shabdiz et al. | |
| 2011/0080848 A1 | 4/2011 | Khorashadi et al. | |
| 2011/0081084 A1 | 4/2011 | Takahashi et al. | |
| 2011/0081919 A1* | 4/2011 | Das et al. | 455/456.1 |
| 2011/0183626 A1 | 7/2011 | Das et al. | |
| 2011/0190004 A1 | 8/2011 | Tenny et al. | |
| 2011/0201350 A1 | 8/2011 | Das et al. | |
| 2012/0130632 A1 | 5/2012 | Bandyopadhyay et al. | |
| 2012/0289249 A1* | 11/2012 | Bhattacharya et al. | 455/456.1 |
| 2012/0293371 A1 | 11/2012 | Lu | |
| 2013/0122941 A1 | 5/2013 | Das et al. | |
| 2013/0230208 A1 | 9/2013 | Gupta et al. | |

FOREIGN PATENT DOCUMENTS

| | | |
|---|---|---|
| CN | 1832513 A | 9/2006 |
| CN | 101162151 A | 4/2008 |
| CN | 101162153 A | 4/2008 |
| EP | 1197111 A1 | 4/2002 |
| EP | 1258851 A2 | 11/2002 |
| EP | 1701524 A1 | 9/2006 |
| JP | 10285640 A | 10/1998 |
| JP | H11225365 A | 8/1999 |
| JP | 2001045549 A | 2/2001 |
| JP | 2001508250 A | 6/2001 |
| JP | 2001336941 A | 12/2001 |
| JP | 2002132771 A | 5/2002 |
| JP | 2002152802 A | 5/2002 |
| JP | 2002230673 A | 8/2002 |
| JP | 2003035555 A | 2/2003 |
| JP | 2003162217 A | 6/2003 |
| JP | 2003518625 A | 6/2003 |
| JP | 2003244747 A | 8/2003 |
| JP | 2003295889 A | 10/2003 |
| JP | 2004072546 A | 3/2004 |
| JP | 2005039702 A | 2/2005 |
| JP | 2005051490 A | 2/2005 |
| JP | 2005136897 A | 5/2005 |
| JP | 2006010687 A | 1/2006 |
| JP | 2006090868 A | 4/2006 |
| JP | 2007178279 A | 7/2007 |
| JP | 2007221479 A | 8/2007 |
| JP | 2007322906 A | 12/2007 |
| JP | 2008033043 A | 2/2008 |
| JP | 2008507167 A | 3/2008 |
| JP | 2008206126 A | 9/2008 |
| JP | 2008539672 A | 11/2008 |
| WO | 0149056 | 7/2001 |
| WO | 2004102991 A2 | 11/2004 |
| WO | WO-2004104520 A1 | 12/2004 |
| WO | WO-2006005790 A1 | 1/2006 |
| WO | WO-2006116449 A2 | 11/2006 |
| WO | 2007082534 A1 | 7/2007 |
| WO | 2011095227 A1 | 8/2011 |

OTHER PUBLICATIONS

Zaruba, G. V., et al. "Indoor location tracking using RSSI readings from a single Wi-Fi access point." Wireless networks 13.2 (2007): 221-235.*

"802.11 Broadcast of Local Info", Submitted by Brad Templeton, Mar. 18, 2005, Brad Ideas: Crazy Ideas, Inventions, Essays and Links from Brad Templeton, http://ideas.4brad.com/archives/000188.html.

Doyle, et al., "Evaluating the benefits of multimodal interface design for CoMPASS—a mobile GIS" Geoinformatica, an International Journal on Advances of Computer Science for Geographic Information Systems, Kluwer Academic Publishers, BO, vol. 14, No. 2, Mar. 10, 2009, pp. 135-162, XP019789295, abstract, sections 1-3.

Eissele, M., et al., "Mobile Navigation and Augmentation utilizing Real-World Text", TZI Bericht Nr 44, Sep. 3, 2007, pp. 9-18, XP055059961, Retrieved from the Internet: URL:http://www.tzi.de/fileadmin/resources/publikationen/tzi_berichte/TZI-Bericht-Nr.02.pdf#page=11 [retrieved on Apr. 17, 2013] section 3.

European Search Report—EP12007671—Search Authority—Hague—Jan. 11, 2013.

International Search Report—PCT/US2009/069123, International Search Authority—European Patent Office—Apr. 1, 2010.

Smith, "Tesseract OCR Engine, What it is, where it came from," Google Inc, OSCON 2007.

Written Opinion—PCT/US2009/069123—International Search Authority—European Patent Office—Jan. 4, 2010.

International Search Report and Written Opinion—PCT/US2013/073739—ISA/EPO—Mar. 27, 2014.

Polk J., et al., "RFC 3825: Dynamic Host Configuration Protocol Option for Coordinate-based Location Configuration Information", IETF Network Working Group, Jul. 2004, pp. 1-15.

* cited by examiner

PROVIDING AND UTILIZING MAPS IN LOCATION DETERMINATION BASED ON RSSI AND RTT DATA

CROSS-REFERENCES TO RELATED APPLICATIONS

This application is a continuation-in-part of U.S. application Ser. No. 12/641,225, entitled "A Method and Apparatus for Providing and Utilizing Local Maps and Annotations in Location Determination," filed Dec. 17, 2009, which claims to the benefit of U.S. Provisional Application No. 61/139,993, entitled "Providing Maps and Annotations Relevant to a Location," filed Dec. 22, 2008, and U.S. Provisional Application No. 61/140,023, entitled "Using Local Maps and Annotations in Location Determination," filed Dec. 22, 2008, all of which are assigned to the assignee hereof and expressly incorporated herein by reference.

BACKGROUND

1. Field

The subject matter disclosed herein relates to using local maps and annotations for location determination.

2. Information

Different techniques may be used to estimate the location of a mobile device, such as a cell phone, personal digital assistant (PDA), or any other mobile device. For example, some mobile devices may process signals received from a Satellite Positioning System (SPS) to estimate their locations. However, sometimes there are certain areas where navigation signals from an SPS may not be available, such as in certain indoor locations.

A mobile device may estimate its location within an area where navigation signals transmitted from an SPS are not available. For example, a mobile device may transmit a signal to an access point and measure a length of time until a response signal from the access point is received. A range from the mobile device to the access point may be determined based upon the measured length of time between transmission of a signal from the mobile device and receipt of a response signal at the mobile device. Alternatively, signal strength of a signal received from the access point may be measured and a range from the mobile device to the access point may be estimated based on the measured signal strength. An access point may comprise a device that allows wireless communication devices to communicate with a network.

However, an access point may experience a processing delay between a time at which a signal is received from a mobile device and a time at which a response signal is transmitted to the mobile device. Such a processing delay may vary depending upon a particular access point, and may need to be accounted for when a mobile device estimates a range to the access point based on the measured time interval. Moreover, signal strength of a received signal may vary based upon physical structures within an area, such as a presence of ceiling and walls, causing a variance in received signal strength which may result in inaccurate estimates of range to the access point if there is no accounting for such a variance caused by a presence of physical structures, for example.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
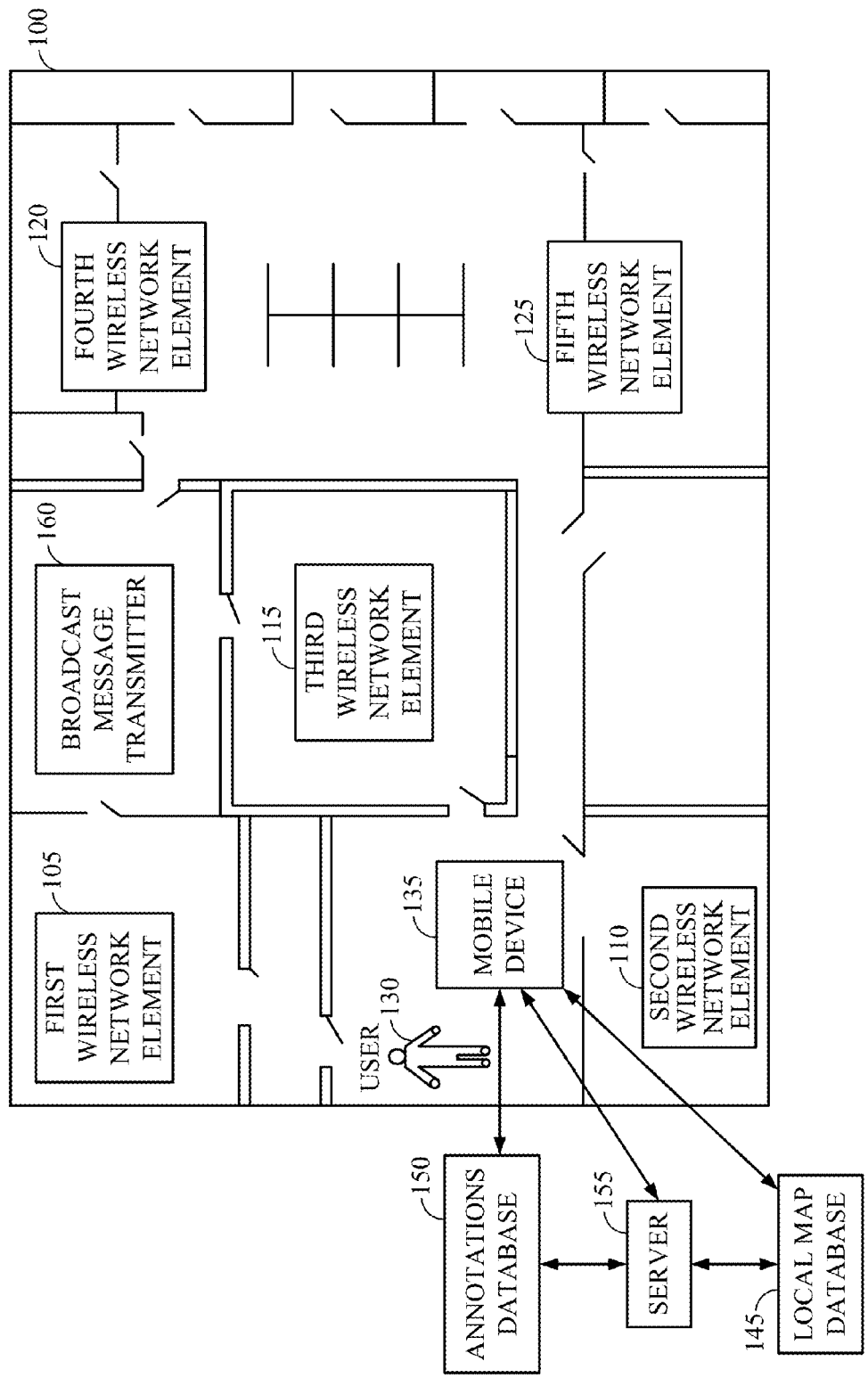
FIG. 1 is a plan view of a floor of an office building having various wireless network elements according to one particular implementation.

In one particular implementation, a system and method is provided for retrieving a local map for a given area. One or more signals wirelessly transmitted from one or more wireless network elements may be received by a mobile device. The mobile device may identify an associated local map based at least in part on the received one or more signals. Such signals may be received from wireless network elements that indicate their presence along with a unique identifier for such wireless network elements such as a Media Access Control (MAC) address, for example. The associated local map and annotations associated with the associated local map may subsequently be obtained, for example, by associating local maps with wireless network element identifiers indicated on a particular local map. The associated local map may utilize a predefined coordinate system. In one implementation, features of the map such as walls, doors, and room numbers, for example, are represented using a local coordinate system with its own datum (e.g., x,y coordinates in units such as feet). It should be understood, however, that this is merely an example implementation and that claimed subject matter is not limited in this respect.

An example method for determining a location of a mobile device based upon weighted Received Signal Strength Indication (RSSI) and Round-Trip Time (RTT) data, according to this disclosure, can include determining an area in which the mobile device is located, and determining a condition of an environment of the mobile device based on location data associated with the area. The method can also include weighting, with a processing unit, RSSI and RTT data based on the condition of the environment; and calculating the location of the mobile device based on the RSSI and RTT data with the determined weighting.

An example non-transitory computer readable storage medium, according to this disclosure, can have instructions embedded thereon for causing a processing unit to perform functions including determining an area in which a mobile device is located, and determining a condition of an environment of the mobile device based on location data associated with the area. The instructions can further cause the processing unit to perform functions including weighting Received Signal Strength Indication (RSSI) and Round-Trip Time (RTT) data based on the condition of the environment; and calculating a location of the mobile device based on the RSSI and RTT data with determined weighting.

An example system for determining a location of a mobile device based upon weighted Received Signal Strength Indication (RSSI) and Round-Trip Time (RTT) data, according to this disclosure, can include means for determining an area in which the mobile device is located, means for determining a condition of an environment of the mobile device based on location data associated with the area, means for weighting Received Signal Strength Indication (RSSI) and Round-Trip Time (RTT) data based on the condition of the environment, and means for calculating the location of the mobile device based on the RSSI and RTT data with determined weighting.

An example mobile device configured to determine a location based upon weighted Received Signal Strength Indication (RSSI) and Round-Trip Time (RTT) data, according to this disclosure, can include a transmitter, a receiver, a memory, and a processing unit coupled with the transmitter, the receiver, and the memory. The processing unit can be configured to determine an area in which the mobile device is located, determine a condition of an environment of the mobile device based on location data associated with the area, weight Received Signal Strength Indication (RSSI) and Round-Trip Time (RTT) data based on the condition of the environment, and calculate the location of the mobile device based on the RSSI and RTT data with determined weighting.

An example method for facilitating a determination of a mobile device's location based upon weighted Received Signal Strength Indication (RSSI) and Round-Trip Time (RTT) data, according to this disclosure, can include obtaining location data corresponding to a plurality of areas associated with a structure, and determining, with a processing unit, for each area of the plurality of areas, a condition of an environment associated with the area, based on the location data, and weighting information based on the condition of the environment associated with the area and relating to weighting RSSI and RTT data. The method can further include sending the weighting information of each area of the plurality of areas to a mobile device.

Another example non-transitory computer readable storage medium, according to this disclosure, can have instructions embedded thereon for causing a processing unit to perform functions including obtaining location data corresponding to a plurality of areas associated with a structure, and determining, for each area of the plurality of areas, a condition of an environment associated with the area, based on the location data, and weighting information based on the condition of the environment associated with the area and relating to weighting RSSI and RTT data. The instructions can further cause a process to send the weighting information of each area of the plurality of areas to a mobile device.

An example system for facilitating a determination of a mobile device's location based upon weighted Received Signal Strength Indication (RSSI) and Round-Trip Time (RTT) data, according to this disclosure, can include means for obtaining location data corresponding to a plurality of areas associated with a structure, and means for determining, for each area of the plurality of areas, a condition of an environment associated with the area, based on the location data, and weighting information based on the condition of the environment associated with the area and relating to weighting RSSI and RTT data. The system can further include means for sending the weighting information of each area of the plurality of areas to a mobile device.

An example server for facilitating a determination of a mobile device's location based upon weighted Received Signal Strength Indication (RSSI) and Round-Trip Time (RTT) data, according to this description, can include a transmitter, a receiver, a memory, and a processing unit communicatively coupled with the transmitter, the receiver, and the memory. The processing unit can be configured to obtain location data corresponding to a plurality of areas associated with a structure, and determine, for each area of the plurality of areas, a condition of an environment associated with the area, based on the location data, and weighting information based on the condition of the environment associated with the area and relating to weighting RSSI and RTT data. The processing unit can further be configured to send, via the transmitter, the weighting information of each area of the plurality of areas to a mobile device.

An example method for determining a mobile device's location based upon weighted Received Signal Strength Indication (RSSI) and Round-Trip Time (RTT) data, according to this disclosure, can include receiving, with a mobile device, weighting information of each area of a plurality of areas, storing the weighting information of each area of the plurality of areas in a memory of the mobile device, and obtaining an RSSI measurement and an RTT measurement relating to an area in which the mobile device is located. The method can further include using the weighting information of the area in which the mobile device is located to determine a first weight for the RSSI measurement, and a second weight for the RTT measurement. The method can also include calculating the mobile device's location using the first weight and the second weight.

Yet another example non-transitory computer readable storage medium, according to this disclosure, can have instructions embedded thereon for causing a processing unit to perform functions including receiving weighting information of each area of a plurality of areas storing the weighting information of each area of the plurality of areas in a memory, and obtaining an RSSI measurement and an RTT measurement relating to an area in which a mobile device is located. The instructions can further cause a processor to use the weighting information of the area in which the mobile device is located to determine a first weight for the RSSI measurement, and a second weight for the RTT measurement. The instructions can further cause a processor to calculate a location of the mobile device using the first weight and the second weight.

An example system for determining a mobile device's location based upon weighted Received Signal Strength Indication (RSSI) and Round-Trip Time (RTT) data, according to this disclosure, can include means for receiving weighting information of each area of a plurality of areas, means for storing the weighting information of each area of the plurality of areas in a memory, and means for obtaining an RSSI measurement and an RTT measurement relating to an area in which a mobile device is located. The system can further include means for using the weighting information of the area in which the mobile device is located to determine a first weight for the RSSI measurement, and a second weight for the RTT measurement. The system can further include means for calculating the mobile device's location using the first weight and the second weight.

An example mobile device configured to determine a location based upon weighted Received Signal Strength Indication (RSSI) and Round-Trip Time (RTT) data, according to this description, can include a transmitter, a receiver, a memory, and a processing unit coupled with the transmitter, the receiver, and the memory. The processor can be configured to receive weighting information of each area of a plurality of areas, store the weighting information of each area of the plurality of areas in the memory, and obtain an RSSI measurement and an RTT measurement relating to an area in which a mobile device is located. The processing unit can also be configured to use the weighting information of the area in which the mobile device is located to determine a first weight for the RSSI measurement, and a second weight for the RTT measurement. The processing unit can further be configured to calculate a location of the mobile device using the first weight and the second weight.

DETAILED DESCRIPTION

Reference throughout this specification to "one example," "one feature," or "an example" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

A mobile device may determine its location or position. In one implementation, a mobile device may estimate its location based on signals wirelessly received from wireless network elements for other devices capable of wirelessly transmitting signals. For example, a mobile device may be utilized within an area where navigation signals from a Satellite Positioning System (SPS) are not available, such as within certain buildings. Wireless network elements may be located throughout such an area at known locations and a mobile device may estimate ranges from the mobile device to particular wireless network elements. Such ranges can be estimated, and a location of such a mobile device may be triangulated using known techniques.

In one implementation, a mobile device may estimate its own location by communicating with one or more nearby femtocells. A "femtocell," as used herein, may refer to a small cellular base station. Such a femtocell may connect to a service provider's network via broadband (such as, for example, via Digital Subscriber Line (DSL) or cable). A femtocell may, for example, utilize a technology such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA), to name just a few among many possible technologies compatible with femtocells. A femtocell may also have integrated Wi-Fi. Round-trip time ranging may be performed by utilizing the femtocell.

A mobile device may use any one of several techniques to estimate a range from the mobile device to a wireless network element. One way of estimating such a range is by wirelessly transmitting a probe request signal to a particular wireless network element. Upon receiving such a probe request, a wireless network element may wirelessly transmit a response signal. A mobile device may measure a time interval (referred to herein as "roundtrip time") between when the mobile device transmits the probe request and a time at which the response signal is received. Wirelessly transmitted signals may travel at a known speed, such as at the speed of light. Accordingly, based upon a roundtrip time between when the probe request is transmitted and when the response is received, a range may be estimated. However, a wireless network element typically experiences a processing delay between a time at which a probe request is received and a time at which a response signal is transmitted. To ensure an accurate estimate of range based on a measured time interval, the mobile device may subtract an estimate of the processing delay from the measured roundtrip time interval. However, different wireless network elements may experience different processing delays. To precisely account for such different processing delays, an estimate of a processing delay specific to a particular wireless network element may be provided to a mobile device as an annotation map for a given area. Once a measurement of roundtrip time between transmitting a probe request and receiving a response signal has been obtained and a processing delay specific to a wireless network element has been subtracted, a measurement of a range to the wireless network element from the mobile device may be estimated based on such a time measurement.

"Wireless network element," as used herein, may refer to a device that allows wireless communication devices to communicate with a network. For example, a wireless network element may comprise, for example, an access point (e.g., a Wi-Fi access point), a femtocell, etc., and may allow wireless communication devices to connect to a wireless network using Wi-Fi, Bluetooth, a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or any other suitable wireless technology and/or standard.

Another technique for estimating a range from a mobile device to a wireless network element includes measuring signal strength of a signal received from a wireless network element. A response signal may be transmitted from a wireless network element to a mobile device in response to a probe request, as discussed above, and a strength of such a response signal may be measured. Based on such a measured signal strength, the range from the mobile device to a wireless network element may be estimated. Alternatively, a wireless network element may periodically broadcast a signal without first receiving a probe request, and a strength of such a received broadcast signal may be measured. In one implementation, wireless network elements may transmit signals at a known signal strength. In a location with no obstructions, for example, a strength of a signal transmitted from a wireless network element may decrease at a known rate over a given range. For example, if a signal strength of a received signal is 80.23% of the strength at which such a signal is transmitted by a wireless network element, a mobile device may estimate a range to the wireless network element to be 100.45 meters in one example implementation. On the other hand if a signal strength of a received signal is measured to be 82.57% of the strength at which such a signal is transmitted by a wireless network element, a mobile device may estimate a range to the wireless network element to be 91.35 meters in one example implementation. Signal strength may decrease at a known rate over distance and, based on the measurement of signal strength of a signal received from a wireless network element, a range from a mobile device to a wireless network element may be estimated. In one example, an annotation on a map for an area may be provided that specifies a mapping of signal strength to distance for a specific wireless network element.

However, the presence of obstructions between a wireless network element and a mobile device may reduce a strength of a signal transmitted from a wireless network element to a mobile device. For example, in an indoor location, a presence of walls between a wireless network element and a mobile device may dissipate a strength of a transmitted signal. Moreover, an amount by which such a signal strength is dissipated may be dependent upon a material of which such a wall is made. For example, a wall made out of drywall may dissipate a strength of a signal by a lower amount than would a wall made of concrete. Accordingly, in order to ensure an accurate estimate of range to a wireless network element from a mobile device based on a measured signal strength, an accounting may be made for such obstructions or a presence of other factors which may reduce signal strength. For example, a conversion formula indicating distance relative to a measured signal strength may be determined for a wireless network element. Such a formula may be dependent based upon a location of a mobile device receiving a signal from a wireless network element. For example, such a formula may apply different weights if a mobile device is 50 meters from a wireless network element and there are no obstructions, than if the mobile device is located somewhere else 50 meters from the wireless network element, but there are several obstructions, such as walls, through which a signal must travel. Such a formula or mathematical relationship may be provided to a mobile device to use in estimating range. In one implementation, such a formula or mathematical relationship may be provided via an annotation to a map.

A mobile device may identify ranges to several wireless network elements. As discussed above, if respective locations of such wireless network elements are known, a mobile device may triangulate its location.

According to one implementation, a mobile device may access a local map if it is within a particular area for which navigations signals from an SPS may not be available. Such a local map may be stored in a location on a network and accessed via Internet, for example. Such a local map may be retrieved and then displayed on a user's mobile device. Such a map may indicate, for example, a location of particular stores within a shopping mall. A mobile device may also retrieve annotations associated with such a local map. Such annotations may be stored at the same location as the local map in some implementations. However, such annotations may be stored in one or more different locations in other implementations. Such annotations may indicate the presence of wireless network elements within an area covered by the local map. In one implementation, such annotations may indicate an estimated processing delay and a formula for estimating a range to one or more wireless network elements based on signal strength of a signal received from the one or more wireless network elements. Such a local map may include a local coordinate system as opposed to a global coordinate system. By utilizing a local coordinate system, a local map may be provided without reference to earth-centered coordinates, such as World Geodetic System (WGS) 84 style global coordinates, for example. A local map may contain structural information about an indoor location specified in a local coordinate system with an origin in the local map itself. Annotations on a local map may comprise information about entities depicted on the local map.

Use of such a local coordinate system may provide certain advantages. For example, it may be easier to locate the devices to which ranging may occur in a local coordinate system than it would be within a global coordinate system. Given a map with a known x,y coordinate grid, access point locations may, for example, be assigned by an information technologies engineer, facilities, or by simply marking them on the map. To perform a similar placement in global coordinate systems, for example, a location is first determined in the global coordinate system. If each point is done natively within a global coordinate system, it may be necessary to perform a location fix based on navigation signals, such as via GPS signals. Performing a location fix based on navigation signals within a building or other structure may, however, be difficult, and is likely to be inaccurate and slow.

Alternatively, multiple location fixes may be taken from pin points in a local coordinate reference system to a global coordinate reference system. Such multiple location fixes may be used to transform local coordinates to global coordinates. To perform such transforming from local to global coordinates, a local coordinate system may first be generated or obtained with accurate placement of network elements within it. Such additional transformation from local to global coordinated may introduce a potential source of error along with requiring extra computations/work.

Upon entering an area, a mobile device may first identify a particular local map associated with the area and may then retrieve the map. In one implementation, a mobile device may broadcast probe requests and may receive response signals from wireless network elements in the area. Some, or all, of such response signals may include information descriptive of a Media Access Control Identifier (MAC ID) which may indicate the identity of the wireless network elements from which such response signals were transmitted. Upon receiving such MAC IDs, a mobile device may reference a database or lookup table, for example, to determine the identity of a map associated with such wireless network elements. In one implementation, a mobile device may access a database accessible via its wireless Internet service provider. Alternatively, a mobile device may access a known network address where such MAC IDs are stored to identify a local map associated with such MAC IDs.

In one implementation, a mobile device may receive signals from wireless network elements associated with one particular local map and additional signals from other wireless network elements associated with a different local map. In such a scenario, a mobile device may determine MAC IDs associated with the received signals having at least a minimum threshold signal strength. A mobile device may then access a database to identify a local map associated with such MAC IDs. In the event that some of the MAC IDs are associated with a first local map and some of the MAC IDs of received signals are associated with a second local map, a mobile device may identify which local map is associated with the strongest received signals, for example. A user may then be presented a choice to select a local map on which they are located from among the likely local maps.

Other ways of identifying a related local map may be utilized in other implementations. In some implementations, a Uniform Reference Identifier ("URI") may be wirelessly transmitted to a mobile device upon entering an area. A "URI," as used herein, may refer to a location where information is stored. For example, a URI may indicate a network address where a local map is stored according to any one of several protocols such as Hypertext Transfer Protocol (HTTP), etc. Such a network address may comprise an Internet address or a local area network address, to name just two among many possible examples. After a URI has been received by a mobile device, the mobile device may access the referenced address or location and retrieve the associated local map.

In one implementation, a local map may be presented to a user and displayed, for example, on a display screen of the user's mobile device. In some implementations, annotations for wireless network elements may be hidden from a user. For example, such annotations for wireless network elements may be hidden because they may clutter a displayed map and a user may not have a desire to view information about such wireless network elements. However, other types of annotations may instead be displayed to a user. A wide array of annotations may be provided to the user's mobile device and displayed. For example, in the event that the user is within a shopping mall, annotations may indicate whether a particular restaurant in the shopping mall has empty seats, locations of cash registers within a store having the shortest wait time to purchase goods, or whether public restrooms are closed for cleaning, to name just a few among many examples.

As discussed above, annotations may be retrieved from one or more locations and may be retrieved from a different location from where a local map is retrieved. In an implementation within a shopping mall, for example, annotations associated with wireless network elements may be retrieved from a first location, annotations associated with a department store may be retrieved from a second location, and annotations associated with common areas of the shopping mall, such as restrooms, may be retrieved from a third location, for example. In one implementation, a mobile device may retrieve various annotations for a local map from different sources and may selectively display one or more of such annotations to a user via a display device.

If a user moves to an area associated with a local map and the user's mobile device identifies and retrieves associated local and related annotations, the mobile device may subsequently utilize annotations related to wireless network elements to determine ranges to wireless network elements. For example, as discussed above, a mobile device may transmit a probe request to one or more wireless network elements and measure a roundtrip time interval until a probe response signal is received from each wireless network element. Such a mobile device may subtract related processing delays associated with relevant wireless network elements, as are indicated by annotations on a local map, and may then estimate ranges to wireless network elements. Such a mobile device may also measure a signal strength of a received signal from various wireless network elements and estimate ranges to such wireless network elements based, at least in part, on a measured signal strength. As discussed above, predefined relationships between received signal strength and range may be indicated on a local map as an annotation for a particular wireless network element. Moreover, such predefined relationships between received signal strength and range may also be dependent upon a particular type of any obstruction between a particular wireless network element and a mobile device. Accordingly, based on such a predefined relationship, a range may be estimated based on the signal strength of a received signal. In one implementation, respective weightings may be determined for a combination of the range results estimated from a probe request roundtrip time interval minus processing delay, and from received signal strength. For example, if one of the methods is determined to yield more accurate results, a larger weighting may be applied to such a method. For example, if an estimate of range determined from received signal strength is estimated to be less accurate than a range estimated from a probe request roundtrip time interval minus processing delay, a weighting of 0.60 may be applied to a range determined from a probe request roundtrip time interval minus processing delay, and a weighting of 0.40 may be applied to a range determined from received signal strength.

If ranges from a mobile device to at least three wireless network elements have been estimated, a mobile device may subsequently triangulate its location. After such a location has been estimated, annotations related to an area where a user is located may be displayed to such a user. For example, directions to a particular store in a shopping mall may be provided to a user based on the user's estimated location.

FIG. 1 is a plan view of a floor 100 of an office building having various wireless network elements installed at known locations according to one particular implementation. As illustrated, first wireless network element 105, second wireless network element 110, third wireless network element 115, fourth wireless network element 120, and fifth wireless network element 125 are arranged throughout floor 100. A user 130 may carry a mobile device 135 and move throughout floor 100. An office building may include floor 100 and potentially many other floors. In one implementation, mobile device 135 may estimate its position by communicating with wireless network elements located on the same floor 100 as the mobile device 135 is located. Different floors may have different floor plans and may have different arrangements of wireless network elements, offices, restrooms, libraries, cafeterias, to name just a few variations among many.

Mobile device 135 may include a display screen, such as a Liquid Crystal Display (LCD), a screen with touch capabilities, or any other type of display capable of presenting a graphical user interface. A display of mobile device 135 may present a local map to user 130. Such a local map may present a 2-dimensional floor plan, or a portion of a floor plan of a floor 100 on which user 130 is moving with mobile device 135. Upon moving onto floor 100, mobile device 135 may not initially know the floor 100 on which it is located at that time and may not have a local map of floor 100 to present to user 130. Upon moving onto floor 100, mobile device 135 may determine an identity of a local map corresponding to a location where mobile device 135 is currently being transported, which in this case is floor 100. There are different ways in which mobile device may determine an identity of a local map to present to user 130. After an identity of an appropriate local map to be presented is determined, mobile device 135 may retrieve such a local map and then present such a local map on, for example, a display of mobile device 135.

In a particular implementation, a mobile device may identify an appropriate local map for a location where mobile device 135 is being held by listening to broadcasts from various wireless network elements, such as access points, femtocells, etc. For example, first wireless network element 105 may periodically broadcast a beacon message. Such a beacon message may indicate a MAC ID for first wireless network element 105. Such a MAC ID may indicate an identifier for first wireless network element. Upon extracting such a MAC ID from a beacon message, mobile device may access a database or lookup table to determine the identity of a local map corresponding to first wireless network element 105. For example, a location of and a method of accessing such a database or lookup table may be known prior to user 130 carrying mobile device 135 onto floor 100. In one implementation, a lookup table for MAC IDs may be stored in one or more predefined database locations. Alternatively, a MAC ID associated with a wireless network element may indicate a location of such a database or lookup table. In other implementations, a MAC ID may directly indicate a local map corresponding to first wireless network element 105.

In one implementation, mobile device 135 may transmit an Institute of Electrical and Electronics Engineers (IEEE) 802.11-compliant probe request to one or more wireless network elements located on floor 100. Upon receipt of such an 802.11-compliant probe request, one or more wireless network elements may transmit responses to mobile device 135. One or more of such responses may include information indicating a URI where a local area map corresponding to floor 100 is accessible.

If a mobile device 135 receives a response to a probe request from a wireless network element, mobile device 135 may subsequently communicate with such a wireless network element. For example, if mobile device 135 is permitted to associate with a particular network element and desires an Internet Protocol (IP) address, mobile device 135 may transmit a Dynamic Host Configuration Protocol (DHCP) "Discover" request to request such an IP address. Upon receipt of such a DHCP Discover request, a wireless network element may respond with a DHCP "Offer" response in which an IP address assigned to mobile device 135 may be contained. A URI indicating a location where a local map associated with the wireless network element may also be included within the DHCP Offer response. Upon receipt of such a DHCP Offer response, mobile device 135 may access the URI and retrieve the associated local map. For example, a URI may be stored in a local map database 145 accessible via the Internet or some other network.

In some implementations, a URI indicating a location where a local map corresponding to an area where mobile device 135 is currently located may be transmitted to mobile device 135 via a network layer broadcast packet. A host attached to a local subnet may listen for broadcast messages on that subnet. One or more of such broadcast messages may contain a relevant URI. One form of an Internet Protocol (IP) subnet specific broadcast is a message delivered to an IP address such as 255.255.255.255 on some specific port. It should be appreciated that there may be subnet-specific versions of such a broadcast utilizing different addresses.

In one particular implementation, a URI may be transmitted to mobile device 135 via a link-layer broadcast frame. For example, there may be an entity located on floor 100 that periodically broadcasts a frame containing the identity of a URI where a local map may be retrieved. Such a broadcast frame may be broadcast by a wireless network element, such as first wireless network element 105, or by some other element within floor 100 that contains a transmitter, such as broadcast message transmitter 160. Broadcast message transmitter 160 may, for example, periodically locally transmit a frame containing such a URI within a compressed format. Upon receipt of such a broadcast frame, mobile device 135 may extract a URI within such a broadcast frame and then retrieve a corresponding local area map stored at the address indicated by such a URI.

In one implementation, a URI may be transmitted to mobile device 135 via beacon information elements, such as a wireless network element or transmitter. For example, multiple elements which are too small individually to transmit such a URI to mobile device 135 may be "stitched" together, or combined, to transmit the URI.

In some implementation, a URI may be encoded into a wireless network element's service set identifier (SSID). For example, devices on a wireless network may utilize a particular SSID in order to communicate with each other. If a local area network element, such as first wireless network element 105, for example, communicates with another element on a local area network, such as second wireless network element 110 or mobile device 135, the SSID may be included in a transmitted message. If mobile device 135 receives such a message from first wireless network element 105, a URI may be extracted from such an SSID, and then mobile device 135 may retrieve a local area map corresponding to floor 100 from the location indicated by the URI.

In one implementation, a URI may be encoded into a wireless network element's basic service set identifier (BSSID). A basic service set may refer to a basic building block of an IEEE 802.11 wireless LAN in one particular implementation. In an infrastructure mode, one wireless network element together with all associated wireless devices or stations may be referred to as a basic service set. A particular wireless network element, such as first wireless network element 105, may transmit both an SSID and a BSSID to mobile device 135. A URI may be encoded in either the SSID, as discussed above, or within the BSSID. For example, both the SSID and the BSSID may be transmitted in a message from first wireless network element 105 to mobile device 135. Upon receipt of such a message, a URI may be extracted from the BSSID and/or SSID. In one particular implementation, a mobile device 135 may be programmed to search for a URI in a received SSID or BSSID.

Use of a local map, as discussed above, provides numerous advantages over a global map. A global map may, for example, be stored in one centralized location. Such a global map may be accessed from such a centralized location and a way of retrieving such a global map may be predefined. However, because such a global map is stored in one centralized location, it may be difficult or cumbersome to update such a global map with information. For example, in the event that the floor plan of a store within a shopping mall is changed during a remodeling process, changes to the floor plan may not be reflected in the global map in a timely manner.

Moreover, a global map may be associated with a global coordinate system, such as the coordinate system associated with Global Positioning System (GPS), or some other Satellite Positioning System (SPS)-defined coordinate system.

A local map, on the other hand, may be much easier to update to reflect changes in elements shown on the local map. Local maps may be easier to maintain because they have only a relatively small field of coverage. Such local maps may be stored in one or more network-accessible locations, such as within a server accessible by the Internet.

Moreover, as pointed out above, a local map need not be associated with a global coordinate system; instead, a local map may be associated with a local coordinate system that may be unrelated to the GPS coordinate system or some other SPS-defined coordinate system. Maps in local coordinate systems may be easier to maintain than maps in global coordinate systems because the position of changed items in maps in local coordinates systems does not have to be determined using navigation signals, such as GPS, or by performing a transformation between coordinates.

Annotations corresponding to a local map may be retrieved before, at the same time, or after the local map has been retrieved. Such annotations may be stored in database 145 shown in FIG. 1 or in some other database or server, such as annotations database 150 or server 155, for example. In one implementation, mobile device 135 may retrieve such annotations from a pre-defined annotations database 150 located at a pre-defined location. Alternatively, a URI for an annotations database 150 may be sent to mobile device 135 in a manner similar to a way in which a URI for local map database 145 is provided to mobile device 135. In other implementations, annotations may be transmitted to mobile device 135 after a local map corresponding to floor 100 has been retrieved from local map database 145. For example, after a local map has been retrieved by mobile device 135 from local map database 145, a message may be sent from local map database 145 to server 155. Server 155 may subsequently retrieve annotations for a local map corresponding to floor 100 from annotations database 150 and transmit such annotations to mobile device 135.

As discussed above, such annotations may include information about wireless network elements. For example, annotations may indicate an estimated processing delay and/or a mathematical model for estimated received signal strength for a signal transmitted by a particular wireless network element. Such annotations may be used by a mobile device to precisely estimate a range between the mobile device and a wireless network element, as discussed below.

Figure 2:
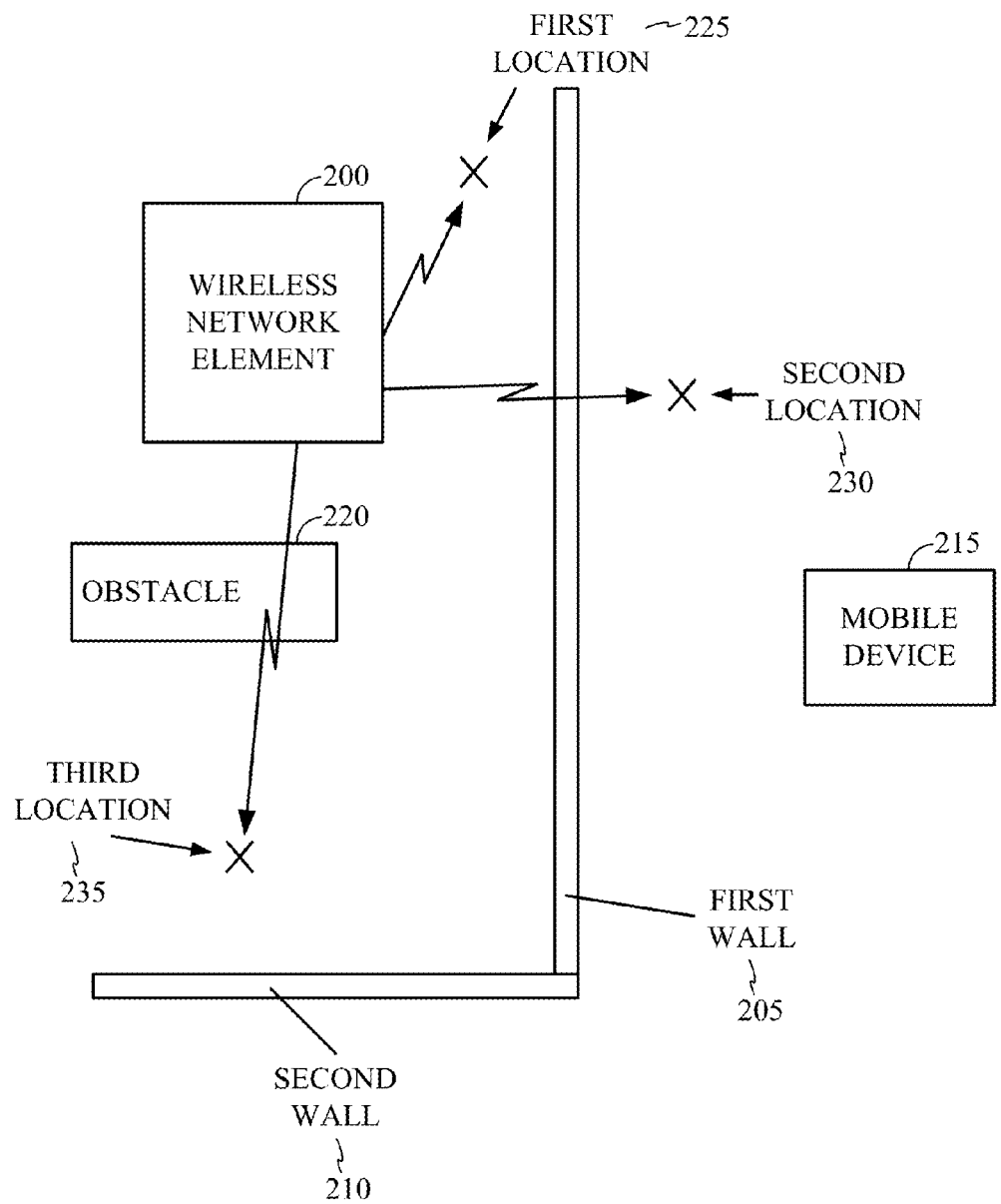
FIG. 2 is an illustration of an area surrounding a wireless network element according to one implementation.

FIG. 2 is an illustration of an area surrounding a wireless network element 200 according to one implementation. FIG. 2 also illustrates a first wall 205, second wall 210, and an obstacle 220. A mobile device 215 may receive a signal transmitted by wireless network element 200 and may estimate its range to wireless network element 200 based, at least in part, on a measured time interval during which a signal is transmitted from wireless network element 200 to mobile device 215.

One way in which a mobile device 215 may estimate a range to wireless network element 200 is by transmitting a probe request to wireless network element 200 and measuring a time interval between when such a probe request is transmitted and when a response signal is received from wireless network element 200. If a mobile device 215 desires to measure a range to wireless network element 200, it may transmit such a probe request to one or more nearby wireless network elements. Such a probe request may indicate that a response signal is to be transmitted back to mobile device 215.

Wirelessly transmitted signals may travel at a constant speed, such as at the speed of light. By measuring how long it takes for a signal to travel from wireless network element 200 to mobile device 215, e.g., a "time-of-flight" of such a signal, a range to wireless network element 200 from mobile device 215 may be estimated. In this example, a probe request is first transmitted from mobile device 215 to wireless network element 200 and then a second signal, e.g., a response signal, is transmitted from wireless network element 200 to mobile device 215. Accordingly, a time-of-flight time interval between transmission of the probe request from mobile device 215 to receipt of a response signal may be divided by a factor of two in order to estimate a range to wireless network element 200 from mobile device 215. Moreover, an estimate of a processing delay incurred by wireless network element 200 may also be taken into account to ensure precise measurements of the actual time that signals are transmitting between mobile device 215 and wireless network element 200. Specifically, there is a period of time from receipt of a probe request at a wireless network element 200 from mobile device 215 to transmission of a response signal from wireless network element 200 to mobile device 215. Such period of time is referred to herein as a "processing delay." Such a processing delay may be incurred, for example, because a wireless network element processes a received probe request and determines how to respond to such a probe request. A processing delay for a particular wireless network element may be estimated based on previous measurements of such a processing delay. Such processing delay estimates may be stored in an annotations database and may be retrieved and utilized by a mobile device 215 if estimating a range to wireless network element 200. Estimates of processing delays for a wireless network element 200 may be updated in an annotations database based on measurements of actual processing delay taken over a period of time.

Another technique to estimate range from mobile device 215 to a wireless network element 200 is based on received signal strength. For example, wireless network elements within a given area may transmit signals at known signal strengths. Alternatively, a code may be transmitted within a signal transmitted by a wireless network element that is indicative of a strength at which such a signal was transmitted. A signal transmitted by a wireless network element may degrade or lose strength the further it travels. A wirelessly transmitted signal may degrade in signal strength at a known rate the further it travels away from a wireless network element from which it was transmitted. Accordingly, by measuring a signal strength of a received signal and comparing it against a strength at which such a signal was transmitted by a wireless network element, a range to the wireless network element from a mobile device receiving such a signal may be estimated.

However, as pointed out above, there may be obstacles disposed between a mobile device and a wireless network element that may dissipate signal strength. For example, if a signal has to travel through a wall, such as first wall 205 or second wall 210 shown in FIG. 2, such a signal may lose more strength as it travels away from wireless network element 200 than it would lose if it did not have to travel through such a wall. In order to estimate a range to a wireless network element 200 from a mobile device 215 with precision, the presence of such obstacles or any other factors besides distance which may degrade signal strength may be factored in when estimating range. Other factors which may degrade signal strength include, for example, interference from other sources if they don't perform a carrier sensing operation and avoid transmission in the presence of an existing signal.

FIG. 2 illustrates three different locations where a mobile device 215 may be located when receiving a signal from wireless network element 200 and estimating a range to wireless network element 200 based on a measured signal strength of a received signal. A signal may be transmitted by wireless network element 200 in response to receipt of a probe request from mobile device 215. Alternatively, wireless network element 200 may broadcast a beacon or some other message or signal received by mobile device 215. As illustrated, if mobile device 215 is located at a first location 225, such a signal may be directly received without travelling through any walls or obstacles. If, on the other hand, mobile device 215 is located at a second location 230, a signal transmitted from wireless network element 200 would therefore travel through first wall 205 prior to reaching the second location 230. Finally, if mobile device 215 is located at a third location 235, a signal transmitted from wireless network element 200 may need to travel through obstacle 220 in order to reach mobile device 215 located at third location 235.

The amount by which the strength of a signal degrades while passing through an object, such as a wall or other obstacle, may depend upon the thickness or density of such a wall/obstacle and a material from which such a wall/obstacle is formed. For example, a wall formed of steel may degrade a signal strength by a greater amount than would a wall formed of a drywall material.

In one particular implementation, a range to a wireless network element may be estimated based both on time-of-flight and on received signal strength. If, for example, an approximate location of a mobile device is triangulated based on ranges estimated based on time-of-flight measurements, then a mathematical model for estimating range based on received signal strength may be utilized to further estimate a range from a mobile device 215 to a wireless network element 200. As discussed above, the amount by which a signal transmitted by wireless network element 200 degrades over distance is dependent, at least in part, upon whether any walls and/or other obstacles are disposed between the wireless network element 200 and the mobile device 215. If the approximate location of mobile device 215 is known via other methods, such as time-of-flight, then an appropriate mathematical relationship between received signal strength and distance may be utilized to estimate range to wireless network element 200 from mobile device 215. For example, if it can be determined that mobile device 215 is located somewhere near second location 230, the presence of first wall 205 may then be factored in if estimating a range from mobile device 215 to wireless network element 200 based on a strength of a signal received by mobile device 215. On the other hand, if it can be determined that mobile device 215 is located somewhere near first location 225, then a different relationship between signal strength and distance may be utilized to estimate a range to wireless network element 200 from mobile device 215. Moreover, if it can be determined that mobile device 215 is located somewhere near third location 235, then a different relationship between signal strength and distance may be utilized to estimate a range from mobile device 215 to wireless network element 200 that accounts for the presence of obstacle 220. Annotations may comprise one or more parameters indicating a relationship between a signal strength measurement and a distance associated with at least one of one or more wireless network elements. Annotations comprise one or more parameters indicating a relationship between a roundtrip time measurement and a distance associated with at least one of one or more wireless network elements.

After ranges to at least three wireless network elements have been determined, a location of such a mobile device may be triangulated.

Figure 3:
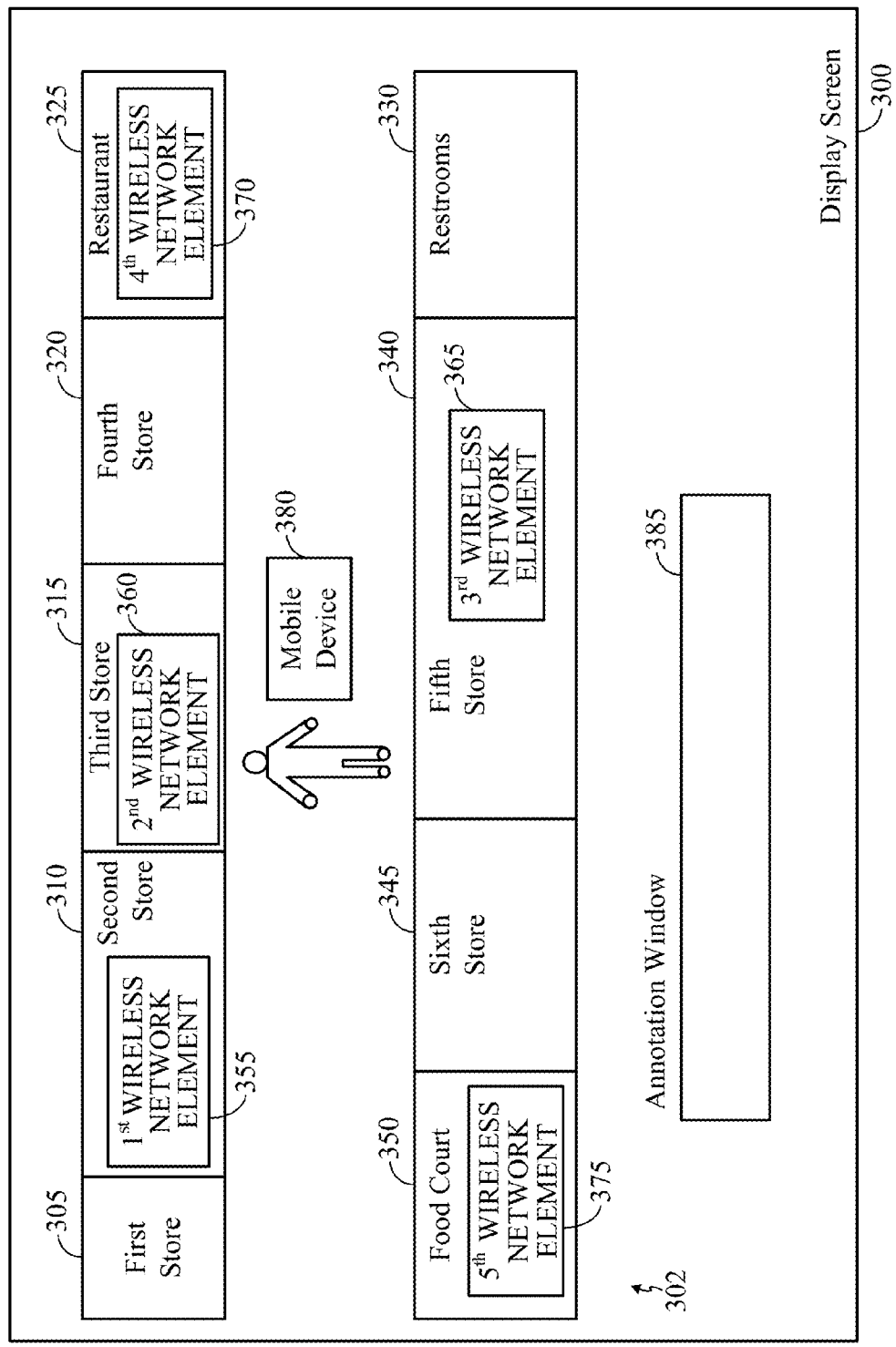
FIG. 3 is a depiction of a display screen of a mobile device according to one implementation.

FIG. 3 is a depiction of a display screen 300 of a mobile device according to one implementation. Such a display screen 300 may comprise a graphical user interface for presenting a local map to a user. The local map may present Points of Interest (POIs) to a user. The POIs may be predefined. The annotations may comprise a notation corresponding to at least one predefined POI. In this example, a local map 302 of a shopping mall is presented to a user. As shown, local map 302 includes depictions of POIs such as a first store 305, second store 310, third store 315, a fourth store 320, a restaurant 325, restrooms 330, fifth store 340, sixth store 345, and food court 350. For ease of illustration, several wireless network elements are also displayed to indicate where they are disposed within a shopping mall depicted by local map 302. However, it should be appreciated that in some implementations, such wireless network elements may not be displayed to a user.

In this example, a shopping mall includes a first wireless network element 355, second wireless network element 360, third wireless network element 365, fourth wireless network element 370, and fifth wireless network element 375. As discussed above with respect to FIGS. 1 and 2, signals transmitted by such wireless network elements may be utilized to determine the identity of a local map corresponding to such a shopping mall and a location from which such a local map may be retrieved. Such signals may further be utilized to determine a location of a mobile device within the local map 302 itself. For example, if a user carrying a mobile device 380 is located in a hallway between third store 315 and fifth store 340, a user and/or mobile device 380 may be depicted as being positioned in such a location on local map 302. In some implementations, only portions of a local map 302 depicting locations near a user and/or mobile device 380 may be displayed to a user. Presenting only a partial map at a time may be performed so that a local map 302 is easier for a user to view and interpret in the event that, for example, a large shopping mall with many stores is depicted within such a local map 302.

As discussed above, annotations for wireless network elements may be retrieved from, for example, an annotations database. Such annotations for wireless network elements may be utilized in determining ranges from mobile device 380 to one or more wireless network elements. Such annotations for wireless network elements may not be presented to a user on local map 302 in some implementations. However, other annotations may be presented to a user. For example, in the event that restrooms 330 are out of order or being cleaned, an annotation may be displayed on local map 302 to inform the user of such a status of restrooms 330. A user may therefore avoid moving over to restrooms 330 to use the restroom and may instead seek a different restroom to use. In some implementations, such an annotation may be displayed directly on top of the restrooms 330 shown in local map. Such an annotation may be reflected as text or a large "X," for example, and may be shown over restrooms 330 on local map 302 to indicate that such restrooms 330 are not available. Alternatively, an annotation window 385 may be utilized to display annotations to a user. For example, text annotation may be displayed that reads, "Restrooms across from Restaurant are currently unavailable."

Additional types of annotations may also be displayed to a user. For example, if there are available seats in restaurant 325, a message may be displayed to let the user know that such seats are available. Moreover, if there is a sale on shoes at second store 310, an annotation may be presented to a user to indicate that such a sale is taking place. Additional types of annotations may include opening and closing times for a particular store or other location depicted on local map 302, whether an escalator is out of order, or whether a particular area of the shopping mall is crowded. In some implementations, a user may select a particular area of local map 302, such a first store 305, for example, via a stylus, mouse, track ball, touch screen, buttons/keys, touch pad, control stick, or other selection tool. Upon selecting first store 305, annotations relating to first store 305 may be presented to a user.

Figure 4:
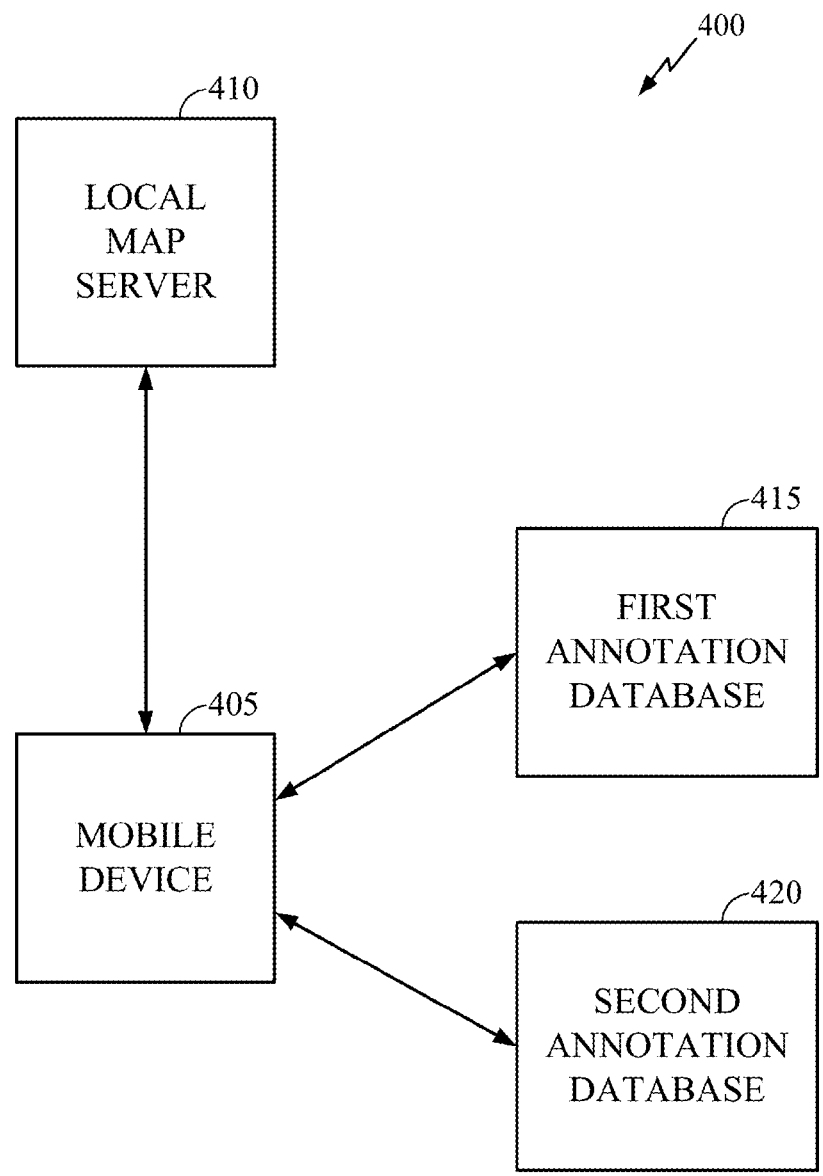
FIG. 4 is a schematic block diagram of a system for providing a local map and annotations to a mobile device according to one implementation.

FIG. 4 is a schematic block diagram of a system 400 for providing a local map and annotations to a mobile device 405 according to one implementation. If a user carries a mobile device 405 into an area corresponding to a local map, such as an area in which navigation signals from an SPS may not be available, such a mobile device 405 may determine the identity of such a corresponding local map and a location from which such a local map may be obtained, as discussed above with respect to FIGS. 1 and 2. Mobile device 405 may subsequently retrieve a local map from a local map server 410. For example, mobile device 405 may receive a URI indicating a network location of such a local map server 410 upon entering an area corresponding to a local map. As discussed above, such a local map may utilize a local coordinate system. For example, such local coordinates may indicate 2-dimensional coordinates relative to a point of origin.

After a local map has been retrieved, annotations for such a local map may be retrieved from one or more sources, such as a first annotation database 415 and a second annotation database 420. For example, annotations relating to various wireless network elements may be stored in first annotation database 415, and annotations for providing other information for a local map to a user may be stored in second annotation database 420. Network addresses or locations of first annotation database 415 and second annotation database 420 may be known to mobile device 405 prior to mobile device 405 entering an area corresponding to a local map. Alternatively, for example, locations of such first annotation database 415 and/or second annotation database 420 may be broadcast or otherwise transmitted to mobile device 405 by one or more wireless network elements or transmitters disposed within the area corresponding to the local map, such as a shopping mall. In another implementation, such network addresses or locations of first annotation database 415 and second annotation database 420 may be stored in local map server 410 and may be provided to mobile device 405 when a corresponding local map is retrieved from local map server 410.

Figure 5:
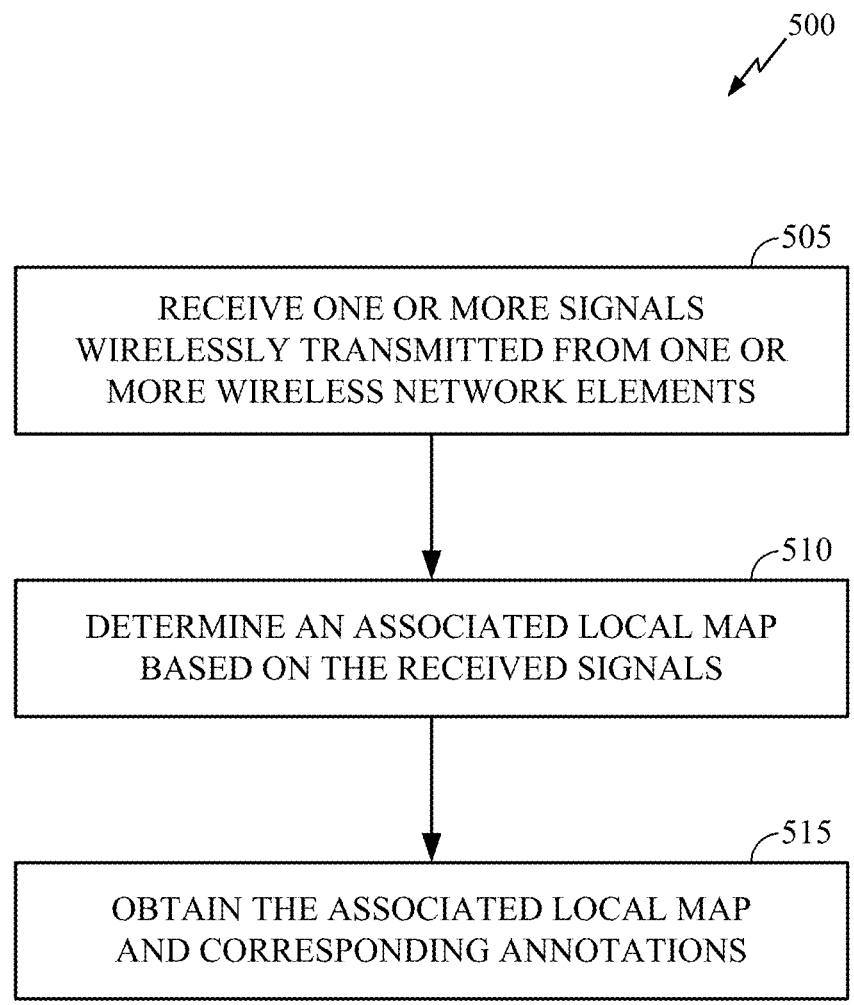
FIG. 5 is a flow diagram illustrating a process for obtaining a local map for a given area according to one implementation.

FIG. 5 is a flow diagram illustrating a process 500 for obtaining a local map for a given area according to one implementation. First, at operation 505, a mobile device may receive one or more signals wirelessly transmitted from one or more wireless network elements. Next, at operation 510, such a mobile device may determine the identity of a local map associated with the wireless network elements based at least in part on the received one or more signals. The mobile device may also receive a URI indicating a location, such as a network address, where such a local map may be retrieved. Finally, at operation 515, the associated local map and annotations associated with the associated local map may be retrieved. For example, such annotations may be received at the same time as the local map or after the local map has been retrieved. In some implementations, the local map and the annotations may be stored in the same location. In other implementations, such a local map and annotations may be stored separately.

Figure 6:
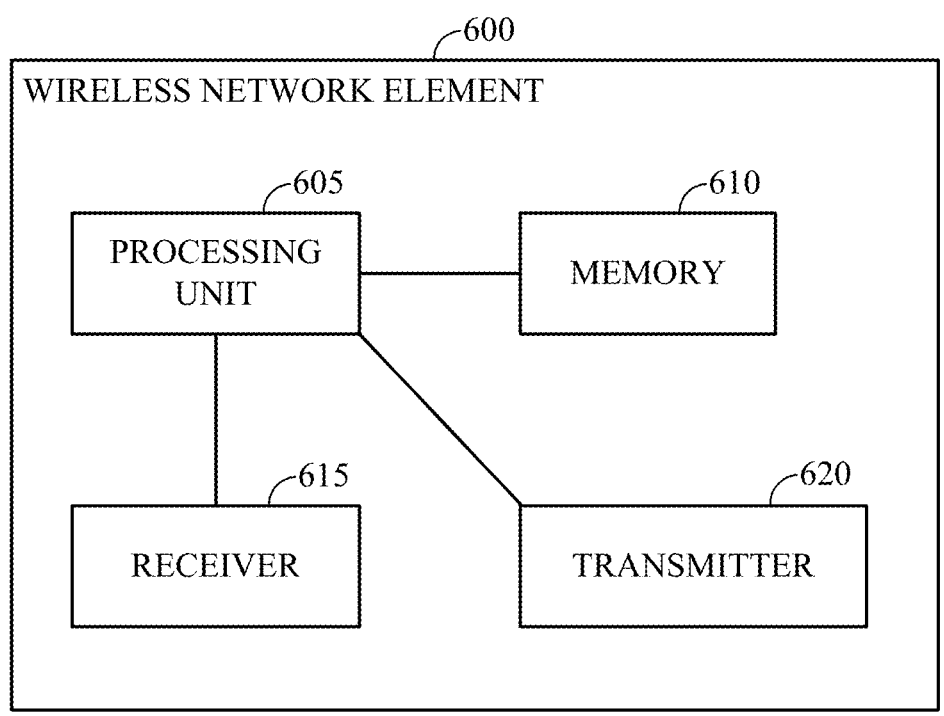
FIG. 6 is a schematic block diagram of a wireless network element according to one implementation.

FIG. 6 is a schematic block diagram of a wireless network element 600 according to one implementation. As shown, wireless network element 600 may include various elements, such as a processing unit 605, memory 610, receiver 615, and transmitter 620. Processing unit 605 may control both receiver 615 and transmitter 620. Processing unit 605 may execute program code or instructions stored in memory 610. Receiver 615 may receive communications from a mobile station (e.g., mobile device 135 of FIG. 1), such as a probe request. Transmitter 620 may transmit a response to a probe request to a mobile station. Receiver 615 and/or transmitter 620 may also communicate with other wireless network elements and/or access points. In some implementations, wireless network element 600 may not include a receiver 615. Wireless network element 600 may provide access to a network to one or more mobile communication devices. Wireless network element 600 may communicate with such mobile communication devices via one or more wireless protocols and/or standards, such as IEEE 802.11, 802.15, or 802.16, Worldwide Interoperability for Microwave Access (WiMAX), or Bluetooth, to name just a few among many different types of wireless protocols and/or standards.

Circuitry, such as transmitters and/or receivers may provide functionality, for example, through the use of various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Communications (GSM), Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. The techniques may be implemented for use with a Ultra Mobile Broadband (UMB) network, a High Rate Packet Data (HRPD) network, a CDMA2000 1X network, GSM, Long-Term Evolution (LTE), and/or the like.

Figure 7:
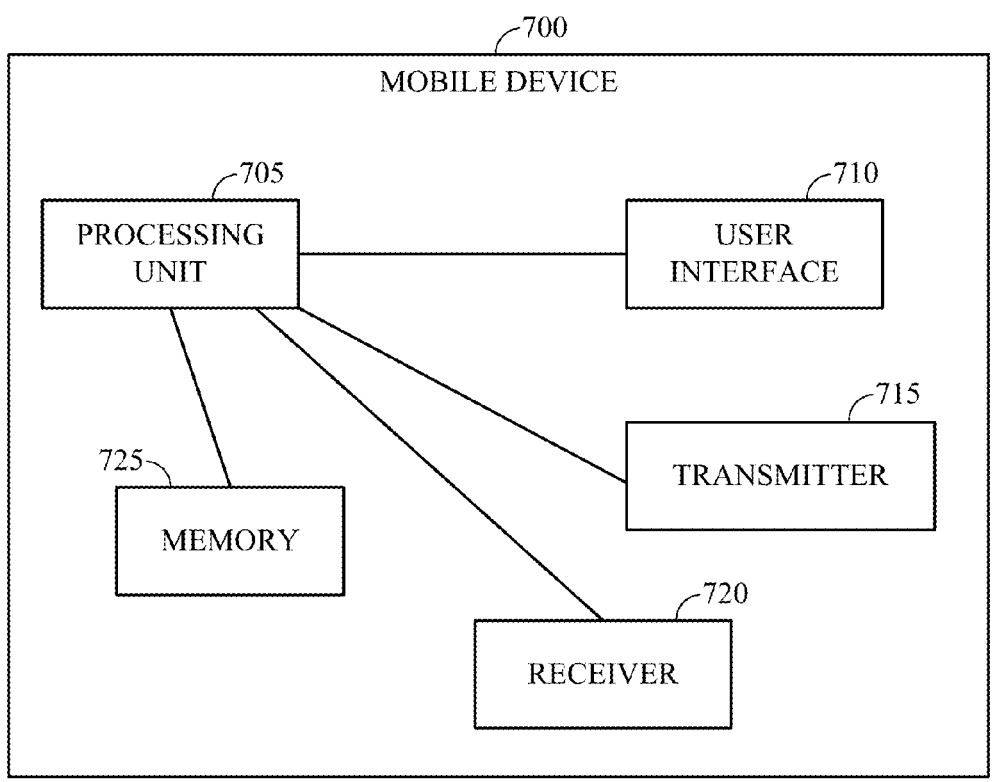
FIG. 7 is a schematic block diagram of particular implementation of a mobile device according to one implementation.

FIG. 7 is a schematic block diagram of a particular implementation of a mobile device 700 according to one implementation. Mobile device 700 may comprise a mobile station (MS) in which a radio transceiver may be adapted to modulate an RF carrier signal with baseband information, such as voice or data, onto an RF carrier, and demodulate a modulated RF carrier to obtain such baseband information.

Mobile device 700 may include several elements such as a processing unit 705, user interface 710, transmitter 715, receiver 720, and memory 725. User interface 710 may comprise a plurality of devices for inputting or outputting user information such as voice or data. Such devices may include, for example, a keyboard/keypad, a display screen (e.g., a touch screen), a microphone, a speaker, buttons and knobs, just to name a few examples.

Memory 725 may be adapted to store machine-readable instructions, which are executable to perform one or more of processes, examples, implementations, or examples thereof which have been described or suggested. Processing unit 705 may be adapted to access and execute such machine-readable instructions. Through execution of these machine-readable instructions, processing unit 705 may direct various elements of mobile device 700 to perform one or more functions.

Transmitter 715 may utilize an antenna to transmit communications, such as packet-based communications to other wireless devices. Receiver 720 may also utilize such an antenna to receive communications, such as packet-based communications from other wireless devices.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processing units programmed with instructions to perform one or more specific functions.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). For SPS, there exist global systems (e.g., GNSS) and various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" also includes devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" includes all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Methodologies described herein may be implemented by various means depending upon applications according to particular features and/or examples. For example, such methodologies may be implemented in hardware, firmware, software, and/or combinations thereof. In an implementation involving hardware, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices designed to perform the functions described herein, and/or combinations thereof.

For an implementation involving firmware and/or software, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or a wireless network element and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

As described previously, environmental conditions, such as the presence of obstructions between a wireless network element (e.g., access point) and a mobile device can affect signal strength of RF communications between the wireless network element and the mobile device, including received signal strength indication (RSSI) and round-trip time (RTT) measurements. The presence and type of the environmental conditions may also impact the relative reliability of these RSSI and RTT measurements. For example, RSSI performance tends to exceed RTT performance in clustered environments, having more obstacles and obstructions between a mobile device and an access point. RTT performance, on the other hand, can be more reliable in open and free environments devoid of obstructions between the mobile device and access points. Accordingly, as indicated previously, environmental conditions can impact weightings for RSSI and RTT measurements in calculations of the mobile device's location. Furthermore, location information (e.g., a map) can include weighting information indicative of environmental conditions at a particular location.

Figure 8A:
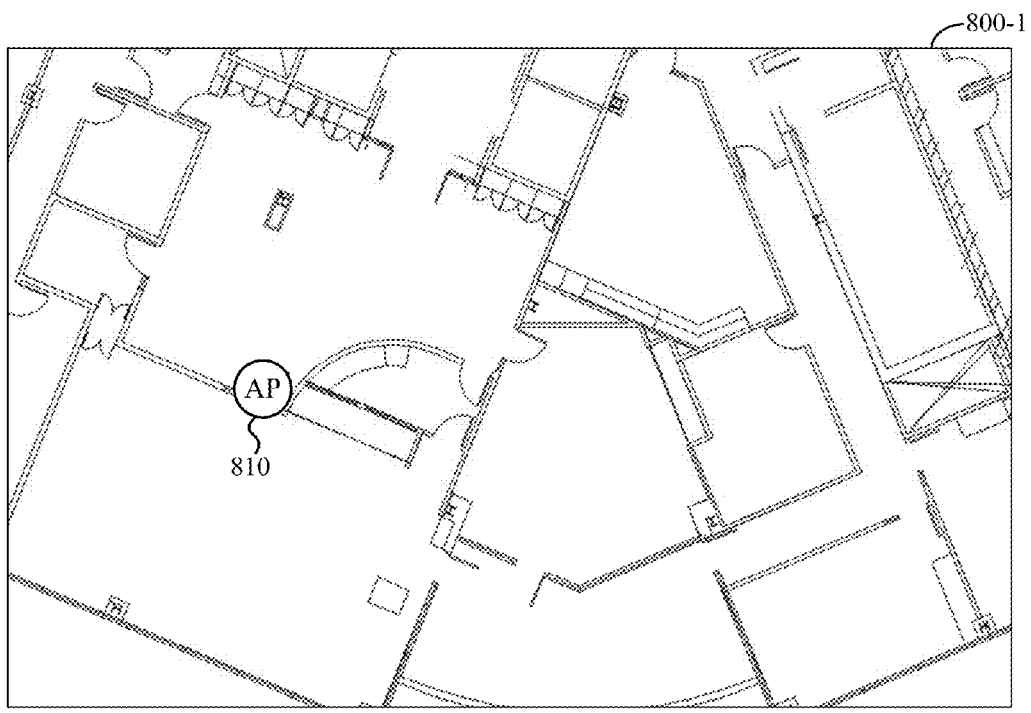
FIG. 8A illustrates a first map providing a layout of a building, according to one embodiment.
Figure 8B:
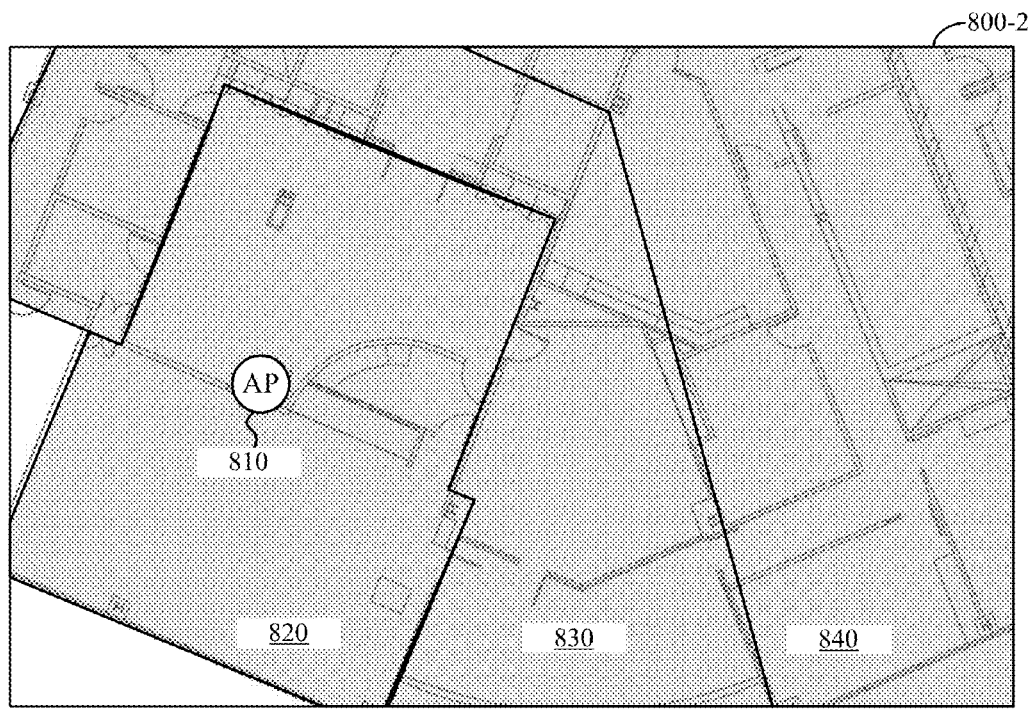
FIG. 8B illustrates a second map, comprising a heatmap based on the first map of FIG. 8A, according to one embodiment.

FIGS. 8A and 8B illustrate how location information, including weighting information, can be provided in the form of a map 800. In FIG. 8A, a first map 800-1 provides a layout of a building. An access point 810 is provided at a location on the map. The map can be stored on a map server, such as the local map server 410 of FIG. 4, access point, and/or other wireless network element, and may be communicated to a mobile device wirelessly. The mobile device can receive the map (or other location data) with a receiver, such as the receiver 615 of FIG. 6.

Depending on the desired functionality, the first map 800-1 can be processed to create a second map 800-2, shown in FIG. 8B, that includes weighting information. In particular, map processing techniques can be used to process the building layout and the location of the access point 810, RSSI and/or RTT models to determine initial weighting information based on obstructions and/or other environmental conditions of a plurality of areas indicated on the map 800.

For example, the first map 800-1 can be processed to determine that, with respect to the access point 810, environmental conditions of three different areas 820, 830, 840 result in different weighting information for each of the three areas 820, 830, 840. The second map 800-2 can therefore act as a heat map, defining boundaries for each of the three areas 820, 830, 840, and providing different weighting information for each of the three areas 820, 830, and 840. A mobile device in a first area 820, for instance, is within the line of sight (LOS) of the access point 810. The second map 800-2 therefore can indicate that RTT measurements taken within the first area 820 can be emphasized over RSSI measurements.

As the number of obstructions between a mobile device and the access point 810 increases, the emphasis of the RSSI data, relative to the RTT measurements, can also increase. For instance, in FIG. 8B, the second map 800-2 defines a second area 830 in which a mobile device would no longer be within the LOS of the access point 810, but would likely have a single wall separating the mobile device from the access point 810. Thus, for a mobile device in the second area 830, may place relatively equal emphasis on RTT and RSSI data, weighting them similarly when calculating the location of the mobile device. In a third area 840, however, where two or more walls may be located between a mobile device in the third area 840 and the access point 810, emphasis may be placed on the RSSI data.

The second map 800-2 showing a heatmap of weighting information based for a plurality of areas can be generated any of a variety of ways. For example, the areas 820, 830, 840 defined by the second map 800-2 may be predefined and associated with the location data (e.g., the first map 800-1) by a map server, using map processing techniques. Additionally or alternatively, the second map 800-2 may be generated by a mobile device after receiving the location data (e.g., the first map 800-1) from the map server (or other device). In fact, depending on the mobile device's capabilities, the second map 800-2 may be generated on the fly from the location data. The determination of which device(s) (e.g., mobile device, access point, map server, etc.) processes the first map 800-1 to generate the second map 800-2 not only can be based on the processing capabilities of the mobile device, but also bandwidth limitations, power concerns, wireless capabilities and/or other factors. Depending on desired format, the weighting information can be provided as metadata tags associated with areas of the second map 800-2.

Embodiments can include more or less information than is shown in the examples of FIGS. 8A and 8B. For example, in addition or as an alternative to walls, location (map) data can include information regarding windows, doorways, building materials (e.g., steel doors, firewalls, etc.), furniture, shelving, etc. Moreover, a mobile device and/or an access point may use RTT and/or RSSI data, data from other sensors (e.g., proximity sensor(s), Bluetooth, camera(s), etc.), and/or location information (e.g., historical location data from one or more mobile devices) to make a determination regarding an environmental condition and/or update the location data. For example, location information indicating that mobile devices always circumvent a particular area may suggest that there is a wall or other obstacle in that area. The location data can be updated to include a wall or other obstacle.

As with other figures provided herein, FIGS. 8A and 8B are provided as an example. Other embodiments may be implemented differently. In fact, weighting information such as heatmaps may be different for different types of devices due to the sensitivity and accuracy of the wireless hardware available on each device. Custom heatmaps may be necessary for different classes of devices based on processing power, bandwidth limitations, wireless capabilities, and/or other concerns.

In some embodiments, rather than including three areas 820, 830, 840 that define similarly-situated regions of a map, some embodiments may provide a heatmap in which a map is split into a grid and each area defined by the grid includes weighting information that applies to that area. The size or granularity of the grid can vary, depending on device capabilities, desired accuracy, and/or other factors. Some embodiments may include a grid in which each area is a 2-foot-by-2-foot square. Other embodiments may include grid areas as little as 6-inch-by-6-inch square, as large as 10-feet-by-10-feet square grid areas, and/or any size in between. Other embodiments may have grid areas outside this range, depending on desired functionality. Furthermore, in some embodiments, the size of grid areas and/or other areas may depend on the corresponding mobile device and/or access point.

Because a mobile device can communicate with multiple access points at a given area, and because a calculation of a mobile device's location can depend on RSSI and/or RTT information from multiple access points, weighting information for multiple access points can be utilized. The method in which this information is provided can vary, depending on application. In some embodiments, different heatmaps can be provided for different access points. In other embodiments, such as embodiments in which location data (e.g., a map) is divided into similar areas for multiple access points, each area can have weighting information for multiple access points. Furthermore, although a mobile device in a certain area may be able to communicate with a large amount of access points, the number of access points for which weighting information is provided can be limited to a subset of those access points, depending on bandwidth and/or other concerns. For example, weighting information for a given area may be limited to the closest access points, the access points having the strongest signal strength, the most accurate and/or reliable access points, etc.

The weighting information for each area of a heatmap (or other form of location data) can vary, depending on desired functionality. In some embodiments, for example, the weighting information associated with an area can include any of a variety metrics that could impact a confidence level of RSSI and/or RTT data obtained in that area. These confidence metrics could include whether there is LOS to the access point, a number of walls between the area and the access point, a wall composition type, a distance to the access point, hardware information of an access point (e.g., a processing delay time for RTT measurements, which can include mean and/or standard deviation). The confidence metrics can also include an expected mean and/or standard deviation of RTT and/or RSSI data, which can be based on models and/or crowdsourced information for that area. Moreover, the confidence metrics can also include a source of the information, which can also impact a confidence level. For example, the confidence metrics can indicate whether the hardware information was provided by a technician, approximated, measured, determined through crowdsourced information, or other technique. A determination of weightings may favor confidence metrics provided by a technician over those that are approximated.

In some embodiments, weighting information could include a confidence level based on one or more of these confidence metrics. The confidence level can indicate the reliability of RSSI and/or RTT data for a given area, based on a predetermined scale. In some embodiments, for example, a map server may use a number and composition of walls, expected mean, and expected standard deviation, to determine a confidence level for both the RSSI and RTT data, based on a scale from 0.0 to 1.0. RSSI and RTT data having a higher confidence levels can be given more weight in location calculations. Other embodiments may use other scales. Additionally or alternatively, some embodiments may provide a heatmap with weighting information that includes the actual weights to provide the RSSI and/or RTT data used in location calculations. In other words, while confidence levels may impact the ultimate weighting of RSSI and/or RTT data in a calculation that may also take into account other factors for the weighting (e.g., device-specific hardware concerns), actual weights may be provided where no additional factors are taken into account in a location calculation or where additional factors are taken into account in a manner independent of the RSSI and/or RTT weights.

Figure 9:
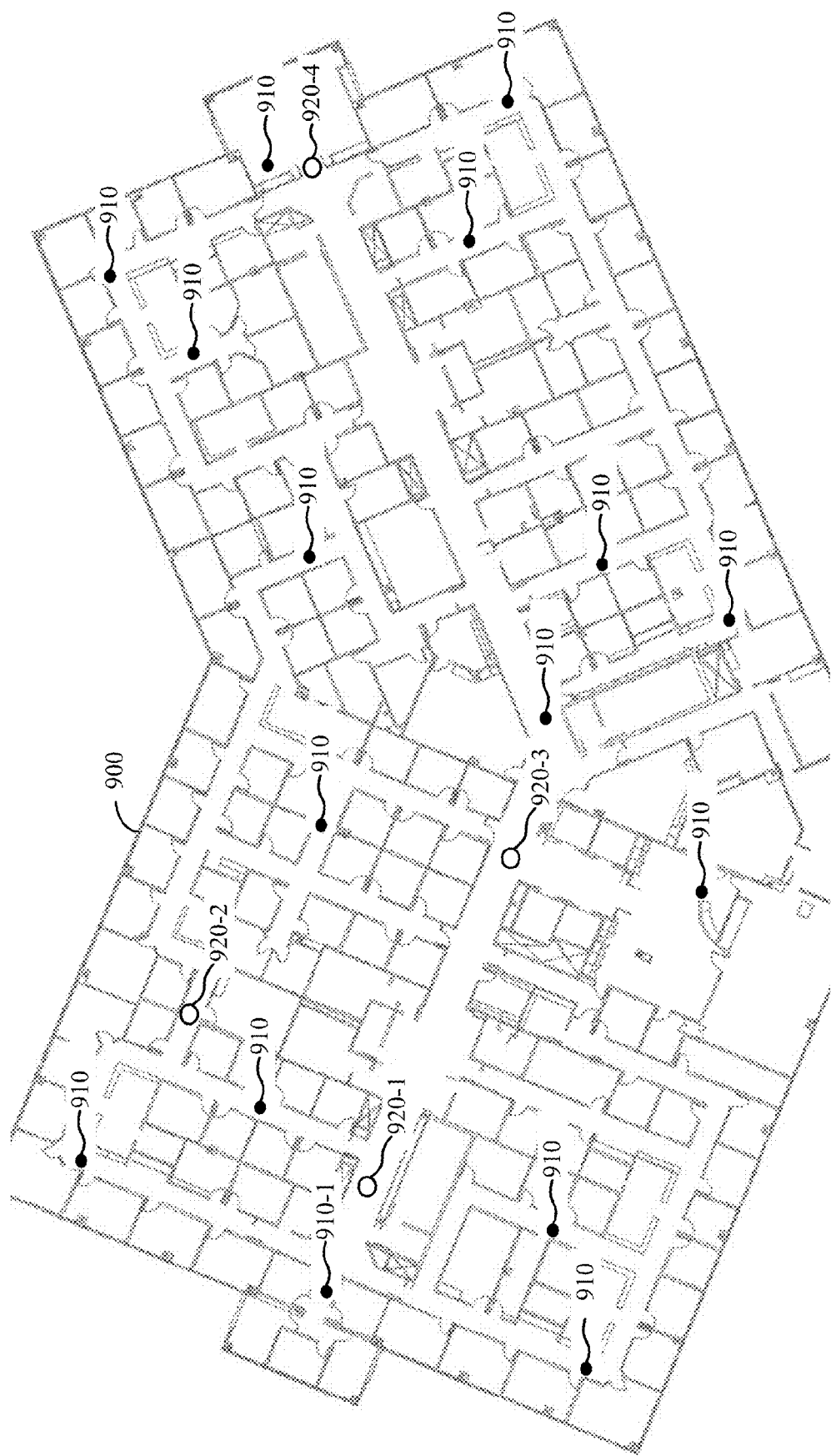
FIG. 9 is a layout of a building that helps illustrate how a heatmap and/or other location data can be used in weighting Received Signal Strength Indication (RSSI) and Round-Trip Time (RTT) data.

FIG. 9 is a layout 900 of a building that helps illustrate how a heatmap and/or other location data can be used in weighting RSSI and/or RTT data. The building can include a large number of access points 910. Depending on a mobile device's location, it may be able to communicate with some or all of these access points. The following example, however, will focus on a how a RSSI and/or RTT data regarding a first access point 910-1 can be weighted when a mobile device is located at various locations within the building.

When a mobile device is at a first location 920-1, it is in close proximity and direct LOS of the first access point 910. Thus, RSSI and RTT measurements between the mobile device and the first access point will likely be reliable. Accordingly, the weightings RSSI and RTT data used in location calculations for the mobile device can emphasize both RSSI and RTT data. Location information provided to the mobile device may include a grid or other area designations, in which weighting information of an area that includes the first location 920-1 indicates that both RSSI and RTT data may be given a relatively large amount of weight in a calculation of the mobile device's location.

When a mobile device is at a second location 920-2, it is no longer in the LOS of the first access point 910. Furthermore, because there are several walls between the first access point 910 and the second location 920-2, RTT data may not be reliable. However, received signal strength may still be at acceptable levels for reliable RSSI measurements because RSSI measurements often can reliably model losses due to walls. And information including walls can be included in map and/or other location information to calculate a mobile device's location. In some embodiments, for example, acceptable levels are between −70 and −75 dBm. In other embodiments, acceptable levels can be anything above −90 or −95 dBm. Yet other embodiments may include acceptable levels outside of these ranges. Because, at the second location 920-2, RSSI data may be reliable, but RTT data may not be reliable, the weightings RSSI and RTT data used in location calculations for the mobile device can emphasize the RSSI data over the RTT data. Again, location information may include weighting information of an area that includes the second location 920-2 and indicates that RSSI data may be given a relatively large amount of weight, relative to RTT data, in a calculation of the mobile device's location.

When a mobile device is at a third location 920-3, it is again in the LOS of the first access point 910, but is relatively far away from the first access point 910-1, resulting in more signal loss. Furthermore, the third location 920-3 down a hallway from the first access point 910, which can induce a "hallway effect" that can be difficult to model in RSSI data. These factors can reduce the reliability of RSSI data, but may not adversely impact RTT measurements to any significant degree. Because location information can indicate the distance of the third location 920-3 as well as environmental factors that may give rise to the "hallway effect," resulting weightings for a location calculation of a mobile device at a third location 920-3 can favor RTT data over RSSI data.

When a mobile device is at a fourth location 920-4, it is not in the LOS of the first access point 910-1 and likely does not receive adequate signal strength for reliable RSSI data. (For example, signal strength may be below −90 or −95 dBm.) In such cases, location information can include weighting information for the first access point 910-1 that indicates that neither RSSI data nor RTT data should be given much weight in calculating the mobile device's location. Thus, more emphasis can be placed on RSSI and/or RTT data from other access points 910 that may have more reliable RSSI and/or RTT data.

Embodiments herein also can provide for updating weighting information, and/or the algorithms used to calculate the weighting information, based on information regarding the effectiveness of the weighting. This information can come from current and/or historical data from one device or multiple devices (i.e., crowdsourcing), and may be kept on a central location (e.g., network element) and/or shared between mobile devices. For example a map server (or other network device) can maintain and update a map with corresponding weighting information (e.g., a heatmap) based on input from a plurality of mobile devices. Additionally or alternatively, each mobile device can maintain and update weighting information and/or share the updated weighting information with a server and/or other mobile device(s). Where a set of location data is associated with a particular structure (e.g., building), a mobile device can store and maintain multiple sets of location data (e.g., maps) for multiple structures. The location data and/or corresponding weighting information may also be time and/or date sensitive. For example, a heatmap in and/or around a crowded cafeteria during lunchtime on a weekday may be different than when it is virtually empty at midnight on a weekend.

Figure 10:
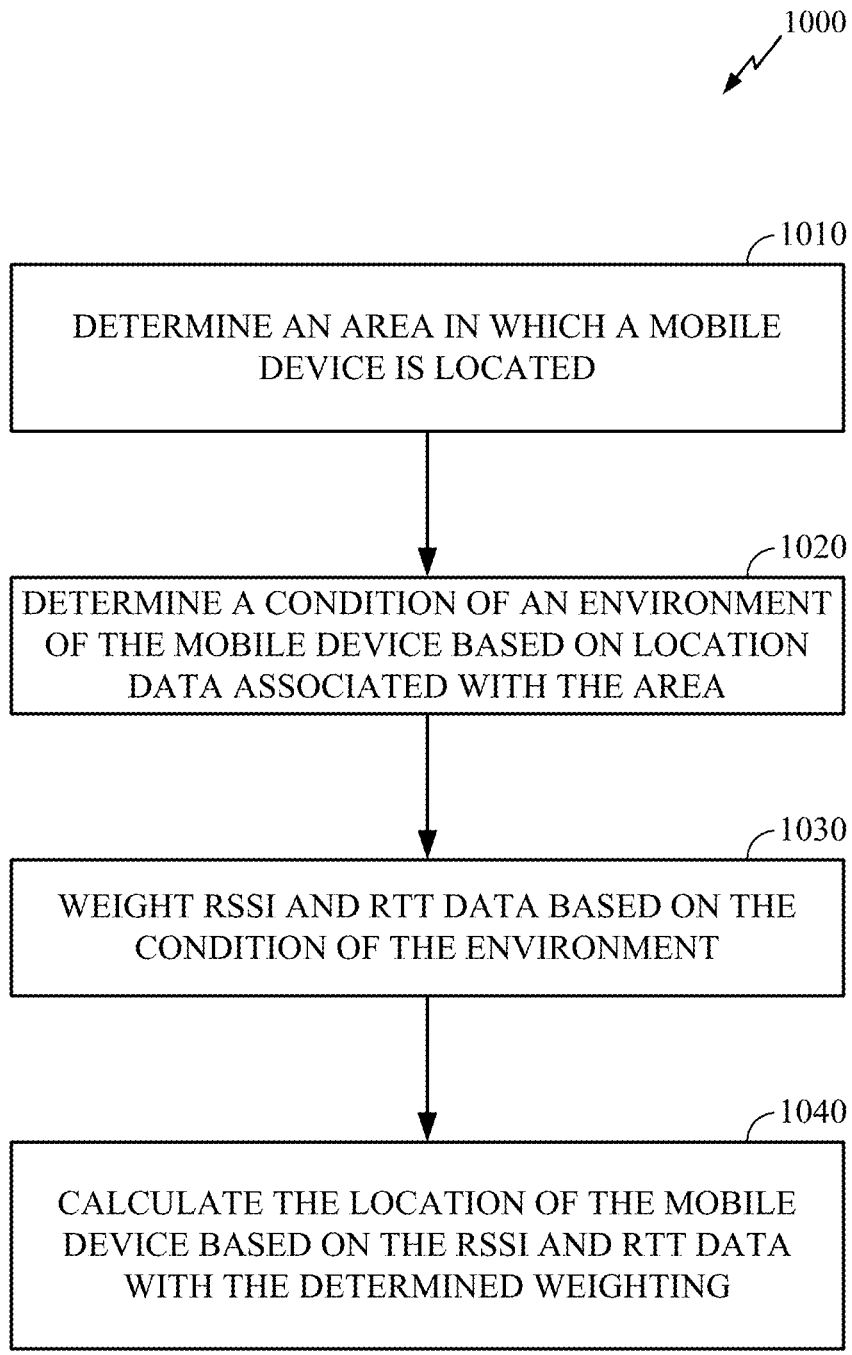
FIG. 10 is a flow chart of a process for determining a location of a mobile device based upon weighted RSSI and RTT data, according to one embodiment.

FIG. 10 is a flow chart of a process 1000 for determining a location of a mobile device based upon weighted RSSI and RTT data. The process 1000 can be executed by a wireless network element (e.g., an access point) such as the wireless network element 600 of FIG. 6, a mobile device such as the mobile device 700 of FIG. 7, a server such as the local map server 410 of FIG. 4, and/or other components of a wireless network described herein. Means for performing some or all components shown in FIG. 10 can include, for example, specialized and/or generalized hardware programmed and/or otherwise configured to perform the components shown. Such means are described in further detail with regard to FIGS. 4, 6, and 7, above.

The process 1000 can begin, as illustrated in block 1010, by determining an area in which a mobile device is located. This initial determination can be based on any of a variety of data, such as previous known location, dead reckoning data, sensor data, GNSS and other signal sources, and the like. Some embodiments may provide for determining a rough location via a location tied to a particular MAC ID which is then used to determine a more accurate location. As discussed herein above, the area in which the mobile device is determined to be located can impact the weightings of RSST and RTT measurements used to calculate a more precise location of the mobile device.

At block 1020, the process also includes determining a condition of an environment of the mobile device based on location data associated with the area. As indicated elsewhere, location data can include information indicative of environmental conditions of one or more areas. The location data can, for example, include a map, such as a layout of a building, which can indicate the location of walls, windows, doors, and/or other structures that could impact the condition of the area's environment. The location data can further include weighting information, which can be generated by using map processing algorithms and may also be indicative of a condition of the area's environment (e.g., number of walls between the area and an access point, wall composition type, a distance, hardware information of an access point, and/or a confidence level for RSSI and/or RTT data (e.g., distance measurements between the mobile device and an access point), etc.). The weighting information may pertain to a single access point, or a plurality of access points, with which RSSI and/or RTT data can be obtained.

At block 1030, RSSI and RTT data are then weighted based on the condition of the environment. Depending on the condition of the environment provided in the location data, this can be implemented in a variety of ways. For example, the weighting, which can include weights for both RSSI and RTT data, can be calculated using one or more confidence metrics provided in the weighting information of the location data. It may also take into account specific information that may not be included in the weighting information, such as device-specific information for a given mobile device and/or access point. For example, a mobile device may have an antenna and/or other signal-reception hardware that would cause RSSI data to be more accurate than other mobile devices, in which case more weight can be given to the RSSI data. In another example, an access point may have certain hardware that causes it to have a processing delay that is less consistent than many other access points, in which case less weight can be given to RTT data measured using that access point. With the weighting determined, the location of the mobile device is then calculated, based at least in part, on the RSSI and RTT data with the determined weighting, as illustrated at block 1040.

As indicated above, the device(s) performing the functions of the process 1000 of FIG. 10 can vary, depending on implementation. For example, some embodiments may implement network-based positioning (NBP), in which one or more network device (e.g., an access point and/or server) obtains information from a mobile device, such as hardware type, characteristics, and the like, and calculates the location of the mobile device based on the obtained information. In some embodiments, the information can be obtained from the mobile device by observation and/or the use of a database or lookup table (based on, for example, a MAC address of the mobile device). In other embodiments, the information can be communicated directly from the mobile device, such as through a protocol. The network device(s) can maintain a heatmap as well, which can be used in the location calculation and/or updated based on input from a plurality of mobile devices (i.e., crowdsourcing). Some embodiments may implement mobile-based positioning (MBP) in which a mobile device obtains information, such as location data, weighting information, and the like, from a network device, such as a server or access point). The mobile device can then compute the mobile device's location by weighting RSSI and RTT data to at least one access point according to the obtained information.

It should be appreciated that the specific steps illustrated in FIG. 10 provides an example process 1000 for determining a location of a mobile device based upon weighted RSSI and RTT data. Alternative embodiments may include alterations to the embodiments shown. Furthermore, additional features may be added or removed depending on the particular applications. For example, embodiments may include a different order in which all available sampling strategies are reduced to the subset of sampling strategies that may ultimately be executed. One of ordinary skill in the art would recognize many variations, modifications, and alternatives.

Figure 11:
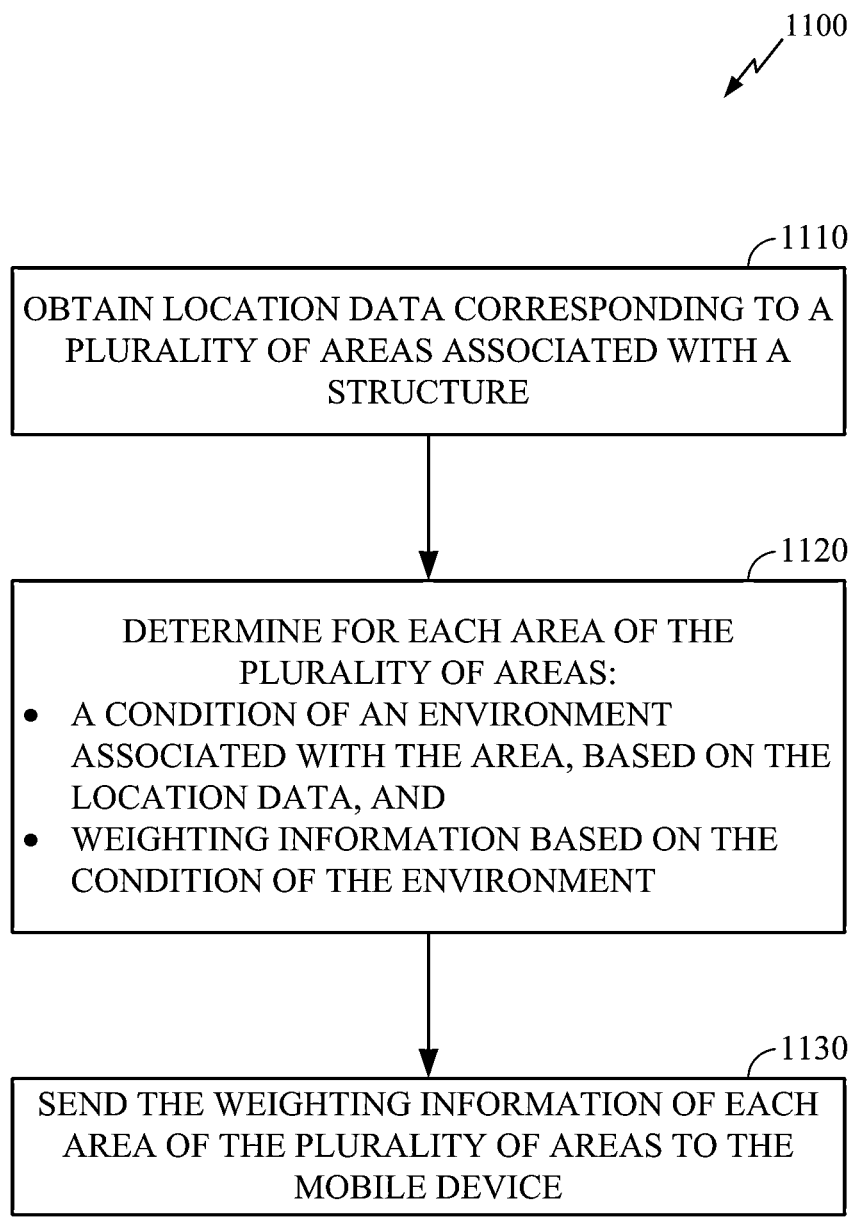
FIG. 11 is a flow chart of a process for facilitating the determination of a mobile device's location based upon weighted RSSI and RTT data, according to one embodiment.

FIG. 11 is a flow chart of a process 1100 for facilitating the determination of a mobile device's location based upon weighted RSSI and RTT data. More specifically, the process 1100 shows how weighting information, such as a heatmap, can be generated and sent to a mobile device for location determination using RSSI and RTT data. The process 1100 can be executed, for example, by a wireless network element (e.g., an access point) such as the wireless network element 600 of FIG. 6, a server such as the local map server 410 of FIG. 4, and/or other components of a wireless network described herein. Means for performing some or all functions shown in FIG. 11 can include, for example, specialized and/or generalized hardware programmed and/or otherwise configured to perform the components shown. Such means are described in further detail with regard to FIGS. 4, and 6 above.

The process 1100 can begin at block 1110 by obtaining location data corresponding to a plurality of areas associated with a structure. The location data can include, for example a layout of a building (or other structure), having several areas. The areas can include physically-separated areas such as rooms, courtyards, hallways, and the like, and/or areas in separated by non-physical boundaries, such as areas of a grid imposed on a map.

At block 1120, the process also includes determining, for each area of the plurality of areas, a condition of an environment associated with the area based on the location data, and weighting information based on the condition of the environment. As indicated previously, location data such as a map can be processed to determine an environmental condition for each area of a plurality of areas. As shown in FIGS. 8A and 8B, for example, the determined environmental condition can be based on a number of walls between an area and an access point. Other environmental conditions may be determined based on the location data. Weighting information based on the condition of the environment can be indicative of the environmental condition, indicating the number of walls, composition of walls, distance, confidence level, hardware information, and/or other factors that can impact RSSI and RTT weighting for each area.

The process 1100 further includes, at block 1130, sending the weighting information of each area of the plurality of areas to the mobile device. Depending on the embodiment, the weighting information could be provided in the form of a heatmap. Where the weighting information is sent by an access point, the weighting information may relate to weighting RSSI and RTT data from the access point, in which case the access point may also exchange RSSI and RTT communications with the mobile device. Of course, as explained above, weighting information can also include information, for each of a plurality of areas, relating to weighting RSSI and RTT data for each of a plurality of access points. In embodiments in which weighting information can be modified by crowdsourcing information from multiple mobile devices, the data can further be received from one or more mobile devices and the weighting information of at least one area of the plurality of areas can be updated, based on the received data.

It should be appreciated that the specific steps illustrated in FIG. 11 provides an example process 1100 for facilitating the determination of a mobile device's location based upon weighted RSSI and RTT data. Alternative embodiments may include alterations to the embodiments shown. Furthermore, additional features may be added or removed depending on the particular applications. For example, embodiments may include a different order in which all available sampling strategies are reduced to the subset of sampling strategies that may ultimately be executed. One of ordinary skill in the art would recognize many variations, modifications, and alternatives.

Figure 12:
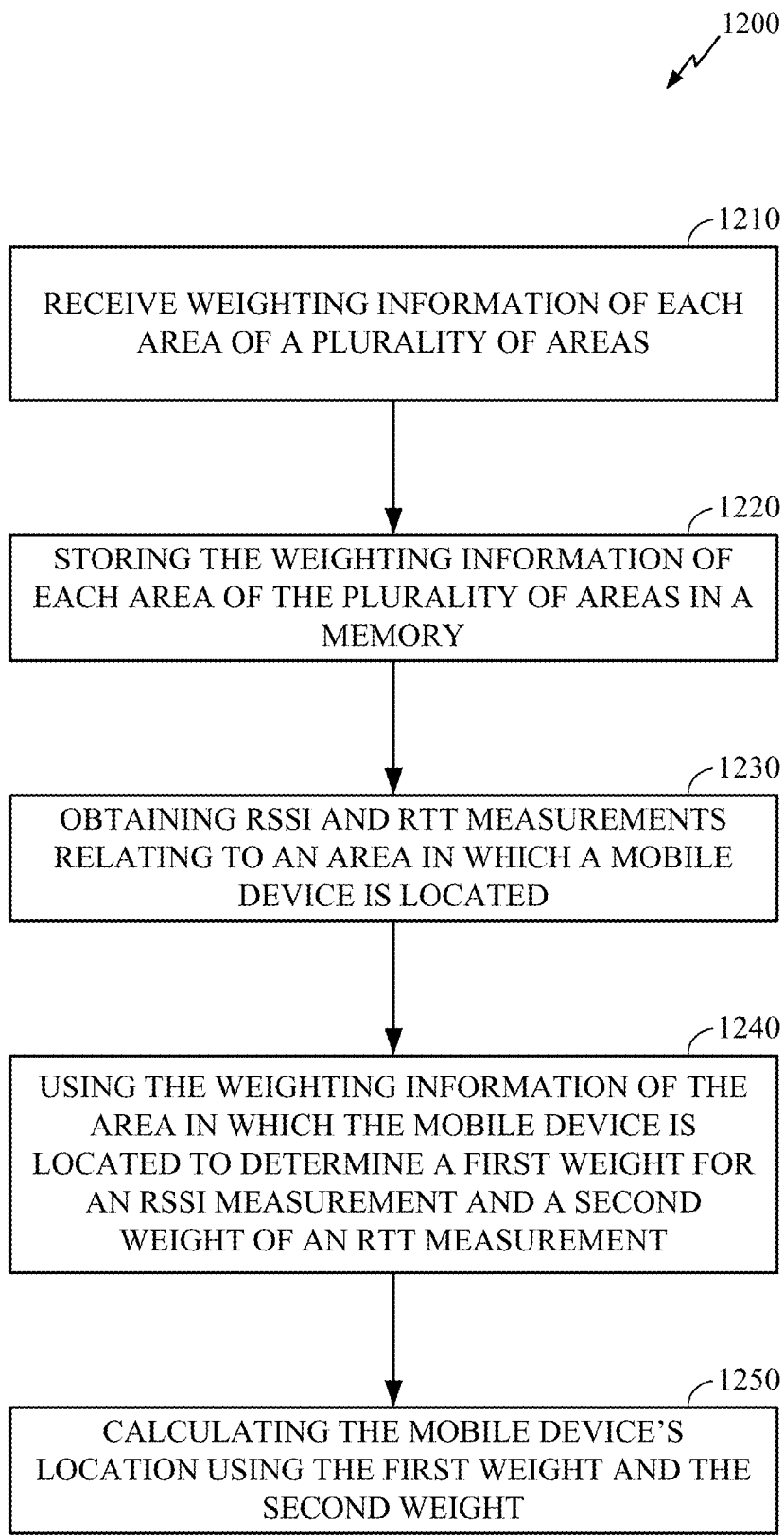
FIG. 12 is a flow chart of a process for determining a mobile device's location based upon weighted RSSI and RTT data, according to one embodiment.

FIG. 12 is a flow chart of a process 1200 for determining a mobile device's location based upon weighted RSSI and RTT data. The process 1200 can be executed by a mobile device such as the mobile device 700 of FIG. 7. Furthermore, a mobile device executing the process 1200 of FIG. 12 can be in communications with a network device executing the process 1100 of FIG. 11. Means for performing some or all components shown in FIG. 12 can include, for example, specialized and/or generalized hardware programmed and/or otherwise configured to perform the components shown. Such means are described in further detail with regard to FIG. 7, above.

The process 1200 can begin by receiving weighting information for each area of a plurality of areas (1210). Weighting information is described in detail above and can include a heatmap and/or other information indicating any of a variety of confidence metrics that may inform a calculation of location based on RSSI and RTT measurements to one or more access points.

The process also includes storing the weighting information of each area of a plurality of areas in a memory (1220), such as the mobile device memory 725 of FIG. 7. Storing the weighting information in this manner can help reduce subsequent communications between the mobile device and allow the mobile device to update and/or otherwise modify the weighting information based on historical data of the mobile device and/or subsequent information obtained from network devices and/or other mobile devices.

An RSSI measurement and an RTT measurement are then obtained, relating to an area in which a mobile device is located (1230). Depending on desired functionality of the network, these measurements can be taken periodically and/or as needed. Moreover, they may be taken as part of a protocol of the network. The weighting information of the area in which the mobile device is located is then used to determine a first weight for the RSSI measurement and a second weight of an RTT measurement (1240). In some embodiments, this can include calculating a confidence level for either or both of the RSSI and/or RTT measurements based on the weighting information, which can include one or more confidence metrics that can inform the confidence level.

The mobile device's location is then calculated using the first weight and the second weight (1250). In some embodiments, multiple RSSI and/or RTT measurements can be obtained, each of which may relate to different access points, may include different weightings, and may be used in calculating the mobile device's location. As indicated above, embodiments may allow a mobile device to update and/or otherwise modify the weighting information based on historical data and/or data received from another mobile device. Thus, for example, the mobile device can update the weighting information of at least one area of the plurality of areas.

It should be appreciated that the specific steps illustrated in FIG. 12 provides an example process 1200 for determining a mobile device's location based upon weighted RSSI and RTT data. Alternative embodiments may include alterations to the embodiments shown. Furthermore, additional features may be added or removed depending on the particular applications. For example, embodiments may include a different order in which all available sampling strategies are reduced to the subset of sampling strategies that may ultimately be executed. One of ordinary skill in the art would recognize many variations, modifications, and alternatives.

As used herein, the term "based on," when describing embodiments of the invention, can also be interpreted broadly as "partially based on" and/or "based, at least in part, on." Thus, if result A is "based on" factor B, then A may be based on one or more other factors.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for determining a location of a mobile device based upon weighted Received Signal Strength Indication (RSSI) and Round-Trip Time (RTT) data, the method comprising:
   determining an area in which the mobile device is located;
   determining a condition of an environment of the mobile device based on location data associated with the area, wherein the location data includes obstruction information;
   determining a number of obstructions between the area and a wireless access point based on the obstruction information;
   weighting, with a processing unit, RSSI and RTT data based on the obstruction information, wherein an emphasis placed on the RTT data and the RSSI data is based on the number of obstructions, wherein the RTT data is emphasized if the number of obstructions is zero, the RTT data and the RSSI data have an equal emphasis if the number of obstruction is one, and the RSSI data is emphasized if the number of obstructions is two or more; and
   calculating the location of the mobile device based on the RSSI and RTT data with the determined weighting.

2. The method of claim 1, wherein the location data further comprises a map.

3. The method of claim 2, wherein the map comprises a heatmap having weighting information for each area of a plurality of areas.

4. The method of claim 2, wherein the map includes a layout of a building.

5. The method of claim 1, wherein the obstruction information comprises information regarding the location of at least one of:
   a wall,
   a window,
   a doorway,
   a building material,
   furniture, or
   shelving.

6. The method of claim 1, wherein the location data associated with the area is received by a receiver of the mobile device.

7. The method of claim 1, further comprising updating the location data associated with the area.

8. The method of claim 7, wherein updating the location data associated with the area is based on at least one of:
   the RTT data,
   the RSSI data,
   data from a sensor of the mobile device,
   historical data from the mobile device, or
   data from at least one other mobile device.

9. The method of claim 1, wherein the location data depends upon on either or both of:
   a time, or
   a date.

10. The method of claim 1, wherein adjusting the weighting of the RSSI and RTT data is further based on a device type of the mobile device.

11. The method of claim 1, wherein the obstruction information includes a wall composition type.

12. A non-transitory computer readable storage medium having instructions embedded thereon for causing a processing unit to perform functions including:
   determining an area in which a mobile device is located;
   determining a condition of an environment of the mobile device based on location data associated with the area, wherein the location data includes obstruction information;
   determining a number of obstructions between the area and a wireless access point based on the obstruction information;
   weighting Received Signal Strength Indication (RSSI) and Round-Trip Time RTT) data based on the obstruction information, wherein an emphasis placed on the RTT data and the RSSI data is based on the number of obstructions, wherein the RTT data is emphasized if the number of obstructions is zero, the RTT data and the RSSI data have an equal emphasis if the number of obstructions is one, and the RSSI data is emphasized if the number of obstructions is two or more; and
   calculating a location of the mobile device based on the RSSI and RTT data with determined weighting.

13. The computer readable storage medium of claim 12, wherein the instructions for determining the condition of the environment of the mobile device include instructions for determining the condition of the environment based on a map and the obstruction information.

14. The computer readable storage medium of claim 13, wherein the map comprises a heatmap having weighting information for each area of a plurality of areas.

15. The computer readable storage medium of claim 13, wherein the map includes a layout of a building.

16. The computer readable storage medium of claim 12, further comprising instructions for updating the location data associated with the area.

17. The computer readable storage medium of claim 12, wherein the instructions for determining the weighting of the RSSI and RTT data include instructions for determining the weighting of the RSSI and RTT data based on a device type of the mobile device.

18. A system for determining a location of a mobile device based upon weighted Received Signal Strength Indication (RSSI) and Round-Trip Time (RTT) data, the system comprising:
   means for determining an area in which the mobile device is located;
   means for determining a condition of an environment of the mobile device based on location data associated with the area, wherein the location data includes obstruction information;
   means for determining a number of obstructions between the area and a wireless access point based on the obstruction information
   means for weighting Received Signal Strength Indication (RSSI) and Round-Trip Time (RTT) data based on the obstruction information, wherein an emphasis placed on the RTT data and the RSSI data is based on the number of obstructions, wherein the RTT data is emphasized if the number of obstructions is zero, the RTT data and the RSSI data have an equal emphasis if the number of obstruction is one, and the RSSI data is emphasized if the number of obstructions is two or more; and
   means for calculating the location of the mobile device based on the RSSI and RTT data with determined weighting.

19. The system of claim 18, wherein the means for determining the condition of the environment of the mobile device include means for determining the condition of the environment based on a map and the obstruction information.

20. The system of claim 19, wherein the map comprises a heatmap having a plurality of location classifications.

21. The system of claim 19, further comprising means for updating the location data associated with the area.

22. The system of claim 19, wherein the means for determining the weighting of the RSSI and RTT data include means for determining the weighting of the RSSI and RTT data based on a device type of the mobile device.

23. A mobile device configured to determine a location based upon weighted Received Signal Strength Indication (RSSI) and Round-Trip Time (RTT) data, the mobile device comprising:
- a transmitter;
- a receiver;
- a memory; and
- a processing unit coupled with the transmitter, the receiver, and the memory, the processing unit configured to:
  - determine an area in which the mobile device is located;
  - determine a condition of an environment of the mobile device based on location data associated with the area, wherein the location data includes obstruction information;
  - determine a number of obstructions between the area and a wireless access point based on the obstruction information;
  - weight Received Signal Strength Indication (RSSI) and Round-Trip Time (RTT) data based on the obstruction information, wherein an emphasis placed on the RTT data and the RSSI data is based on the number of obstructions, wherein the RTT data is emphasized if the number of obstructions is zero, the RTT data and the RSSI data have an equal emphasis if the number of obstruction is one, and the RSSI data is emphasized if the number of obstructions is two or more; and
  - calculate the location of the mobile device based on the RSSI and RTT data with determined weighting.

24. The mobile device of claim 23, wherein the processing unit is configured to determine the condition of the environment of the mobile device based on a map stored in the memory, wherein the map includes the obstruction information.

25. The mobile device of claim 24, wherein the processing unit is further configured to receive the map with the receiver.

26. The mobile device of claim 23, wherein the processing unit is further configured to update the location data associated with the area.

27. The mobile device of claim 23, wherein the processing unit is further configured to determine the weighting of the RSSI and RTT data based on a device type of the mobile device.

* * * * *